US008023159B2

(12) United States Patent
Braudaway et al.

(10) Patent No.: US 8,023,159 B2
(45) Date of Patent: Sep. 20, 2011

(54) MARKING IMAGES OF TEXT WITH SPECKLE PATTERNS FOR THEFT DETERRENCE

(75) Inventors: Gordon W. Braudaway, Yorktown Heights, NY (US); Frederick C. Mintzer, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 12/169,786

(22) Filed: Jul. 9, 2008

(65) Prior Publication Data

US 2009/0021795 A1     Jan. 22, 2009

Related U.S. Application Data

(63) Continuation of application No. 11/282,912, filed on Nov. 18, 2005, now abandoned.

(51) Int. Cl.
*H04N 1/40* (2006.01)
*G06K 9/00* (2006.01)

(52) U.S. Cl. ...... 358/3.28; 358/1.9; 358/1.14; 358/1.18; 358/2.1; 358/3.1; 358/1.4; 358/1.8; 358/2.99; 358/505; 382/100; 382/232; 382/135; 382/137; 382/248; 382/250; 382/284; 380/22; 380/43; 380/51; 380/54; 380/201

(58) Field of Classification Search .................. None
See application file for complete search history.

(56) References Cited

U.S. PATENT DOCUMENTS

| 6,240,121 | B1 | 5/2001 | Senoh | |
|---|---|---|---|---|
| 6,334,187 | B1 | 12/2001 | Kadono | |
| 6,580,804 | B1 * | 6/2003 | Abe | 382/100 |
| 6,952,484 | B1 * | 10/2005 | Higginbottom et al. | 382/100 |
| 7,142,689 | B2 * | 11/2006 | Hayashi et al. | 382/100 |
| 7,224,820 | B2 | 5/2007 | Inomata et al. | |

| 2002/0044673 | A1 | 4/2002 | Powell et al. |
|---|---|---|---|
| 2002/0099943 | A1 | 7/2002 | Rodriguez et al. |

(Continued)

FOREIGN PATENT DOCUMENTS

EP     0838785     4/1998

(Continued)

OTHER PUBLICATIONS

"Improved Watermark Detection Reliability Using Filtering Before Correlation", Geert Depovere, Ton Kalker and Jean-Paul Linnartz, 0-8186-8821-1/98, 1998 IEEE.*

(Continued)

*Primary Examiner* — David K Moore
*Assistant Examiner* — Steven Kau
(74) *Attorney, Agent, or Firm* — Brian Verminski; Hoffman Warnick LLC

(57) ABSTRACT

The present invention provides methods and apparatus for embedding an identifying pattern of visible speckles into the digitized image of each page of a document. A speckle is a cluster of black or white pixels. Speckles are printed as black speckles on the white paper, or conversely, as areas of missing black removed from the black text characters, called white speckles. The collective pattern of all embedded black and white speckles on a single document page is called a specklemark. A specklemark can survive contrast manipulations on photocopiers and binary rasterization done by fax scanning prior to data transmission. The random pattern of the black and white speckles visible in the digitized image of a document page can be detected automatically, and by systematically matching the detected pattern with those known to have been embedded into marked copies of a document page, a specific document copy can be identified. Methods for composing, embedding and detecting specklemarks are the subject of this patent.

14 Claims, 9 Drawing Sheets

U.S. PATENT DOCUMENTS

| | | | |
|---|---|---|---|
| 2003/0128860 A1 | 7/2003 | Braudaway et al. | |
| 2004/0052401 A1* | 3/2004 | Suzaki | 382/100 |
| 2004/0101160 A1 | 5/2004 | Kunisa | |
| 2005/0152578 A1 | 7/2005 | Rhoads et al. | |
| 2006/0078159 A1* | 4/2006 | Hamatake et al. | 382/100 |

FOREIGN PATENT DOCUMENTS

| | | | |
|---|---|---|---|
| EP | 1006710 | | 6/2000 |
| JP | 2000059610 | | 2/2000 |
| JP | 2001218005 | | 8/2001 |
| JP | 2003101762 | | 4/2003 |
| JP | 2004109172 | | 4/2004 |
| JP | 2005-330622 | * | 12/2005 |
| JP | 2006121656 | | 5/2006 |

OTHER PUBLICATIONS

"European Patent Office Communication pursuant to Article 94(3) EPC" Application No. 06819404.2-1522, Jan. 28, 2009, 3 pages.

Braudaway et al., U.S. Appl. No. 11/282,912, Office Action Communication, Oct. 20, 2008, 22 pages.

Braudaway et al., U.S. Appl. No. 11/282,912, Office Action Communication, Apr. 23, 2009, 24 pages.

"PCT Notification of Transmittal of the International Search Report and the Written Opinion of the International Searching Authority, or the Declaration", May 3, 2007.

Application Serial No. JP-2008-540590, Japan Office Action Communication, Oct. 5, 2010, 5 pages.

WAEM, EP Application No. 06 819 404.2, Examination Report, May 11, 2011, 4 pages.

* cited by examiner

| x/y | 0 | 1 |
|---|---|---|
| 0 | 0 | 1 |
| 1 | 1 | 1 |

Logical-OR of x with y

Fig. 1

| x/y | 0 | 1 |
|---|---|---|
| 0 | 0 | 0 |
| 1 | 0 | 1 |

Logical-AND of x with y

Fig. 2

| x/y | 0 | 1 |
|---|---|---|
| 0 | 0 | 1 |
| 1 | 1 | 0 |

Logical-XOR of x with y

Fig. 3

MARKING IMAGES OF TEXT WITH SPECKLE PATTERNS FOR THEFT DETERRENCE

CROSS-REFERENCE TO RELATED APPLICATIONS

This application is a continuation of application Ser. No. 11/282,912 filed Nov. 18, 2005 now abandoned.

FIELD OF THE INVENTION

This application relates to the fields of digitized imaging and its use for document security and theft deterrence. It is more specifically concerned with the embedding of identifying marks, herein individually called speckles and collectively a specklemark, into electronic copies of a document prior to its being transmitted or printed, and the subsequent detection or non-detection of those identifying marks in digitized images that are either in electronic form or a hard copy form, the latter having been re-digitized by scanning.

BACKGROUND OF THE INVENTION

It is a constant endeavor to find improved techniques for placing identifying marks into high-value documents, such as scripts for proposed motion pictures or television programs, drafts of unpublished books, etc., that are targets for theft or malicious appropriation. The protection that can be offered by these techniques is necessarily limited. For example, if the thief has obtained a copy and chooses to retype the stolen document, there is little or no protection that can be offered.

However, retyping of a lengthy document is an expensive and time consuming action. If the thief is less diligent and attempts to photocopy, fax or otherwise electronically reproduce the stolen document, a good degree of protection can be offered by embedding into each page of a document uniquely identifiable and cryptographically unpredictable markings.

The markings may be made unique to each copy of an original document, or additionally, to each page of each copy. If a stolen copy of a document is retrieved, the unique pattern can be detected by scanning the retrieved page or pages, spatially aligning them with the unmarked original page or pages, and systematically matching the detected pattern of speckles with one of those known to have been embedded into marked copies of the original document.

DEFINITION OF TERMINOLOGY

A digitized image of a document page, also called a page image, is an abstraction of a physical document page that can be stored in a computer's memory. The digitized image may be prepared for viewing on an electronic display or re-digitized by scanning a printed page. The digitized image is stored as at least one rectangular array of numbers in a computer's memory, with each cluster of numbers corresponding to that image's (one or more) color planes.

Each array element corresponds to a very small spatial area of the physical image and is called a picture element, or pixel. The numeric value associated with each pixel for a monochrome image represents the magnitude of the average brightness of its single color (for example, black and white). A pixel's numeric value is represented by at least one binary digit or bit.

For a color image, each pixel of the digitized image has associated component values, one for each of its at least one color plane, representing the magnitudes of average brightness of its at least one color component represented in its at least one color plane. If the color image has more than one color plane, the color components are associated with spectrally dispersed primary colors that, when blended, represent a range of colors in the spectrum, and the values of the at least two color components are the relative brightness of the at least two primaries used to represent a particular color.

The process of converting a document page from the internal format of a word processor, such as Microsoft Word® or Lotus WordPro®, to that of a digitized image is called rasterization. The rasterization process creates horizontal (or vertical) lines of pixels of a page of text. When closely spaced rasterized lines are viewed on an electronic display or converted to lines of dots of colored inks or toners and printed, the human visual system fuses the individual lines of pixels into recognizable characters of text or other geometric figures.

If the digitized image has been converted from continuous tone picture elements to halftone picture elements, the color component values of the halftone picture elements will be referred to as ink-density values, and the number of color planes in the halftoned representation may be greater than the number of color planes in the digitized image.

Thus, the digitized image rasterized for viewing or printing, the hard copy printed from of the rasterized and halftoned image, and the re-digitized scanned image of a printed page are all distinct, but related, representations of the same document page.

Whenever reference is made herein to color planes, it is understood to include any number of color planes used by a particular image's digitizing technique to define the pixel's color characteristics.

Whenever reference is made herein to a printed copy (also referred to as a hard copy), it is understood that each pixel has an associated ink density or ink-density value. Further, it is understood that an ink-density values refer to any substance that is used to apply color to paper or other substrate material, be that substance ink, dye, toner or other. Further, ink-density values range from 0% to 100%, meaning from no ink applied to the area of a pixel on paper up to total coverage of that area on paper.

SUMMARY OF THE INVENTION

As used herein, a document is composed of at least one page. Using present technology, each document page is converted by rasterization into a digitized image ready for printing or viewing on a display device attached to a computer. When each document page is represented as an image, present methods of image watermarking, such as that described in U.S. Pat. No. 5,825,892, PROTECTING IMAGES WITH AN IMAGE WATERMARK, issued Oct. 20, 1998, (which is incorporated herein by reference in its entirety and for all purposes) can be used to embed virtually invisible but identifiable watermarks as unique texture patterns into each image representing a page. Such image watermarks can survive being printed and then being copied by most office copiers and remain detectable in the copied page. However, in images that contain primarily text, embedded watermarks are vulnerable to decreased contrast adjustments on photocopiers and are generally rendered useless and undetectable by the binary-state rasterization used by fax machines.

In addition to the more common image watermarking just described, another identifying pattern of visible speckles can be embedded into the image of each page. A speckle is a cluster of black or white pixels. The method of embedding speckles into a digitized image is herein referred to as speckling. The collective pattern of all embedded black and white speckles on a single page is herein called a constellation of speckles, and the constellation of speckles is called a specklemark. Each embedded black or white speckle, although visible, is very small, approaching the resolution limit of printers and fax scanners. They are printed as black speckles on the white or other colored paper, or conversely, as areas of missing black removed from the black text characters or other geometric figures, called white speckles. The embedding of speckles applies equally well to the printed form of a document page, to the digitized image of a page ready for viewing on an electronic display prior to its being printed, or to a digitized image formed by scanning and re-digitizing a printed page.

A specklemark can survive contrast manipulations on photocopiers and binary rasterization done by fax scanning prior to data transmission. The random pattern of the black and white speckles visible in the digitized image of a document page can be detected automatically, and by systematically matching the detected pattern with those known to have been embedded into marked copies of a document page, a specific document copy can be identified. Methods for composing, embedding and detecting specklemarks are the subject of this patent.

A first aspect of the present invention provides a method of enhancing document security and detecting fraud, comprising:
embedding information into an original document and subsequently determining the presence of the embedded information in a copy of the original document, the embedding step including: providing a digitized image having at least one image plane, the at least one image plane being represented by an image array having brightness data for a plurality of pixels, each of said pixels having at least one color component and a pixel position; computing a first set of candidate positions for embedding speckles into the digitized image based on information to be embedded; computing a second set of candidate positions for embedding ghost speckles into the digitized image based on the information to be embedded; and embedding the speckles into the digitized image to create a composite image.

A second aspect of the present invention provides a method comprising:
embedding information into at least one page of a document copy and subsequently detecting whether said information had been embedded into at least one page of a suspect document copy, said document copy being in a rasterized format, herein called a digitized page image, said information being embedded through steps of: providing the digitized page image having at least one image plane, each said image plane being represented by an image array having brightness data for a plurality of pixels, each of said pixels having at least one color component and having a pixel position; computing a first set of candidate positions for embedding black speckles into the page image based on said information to be embedded; computing a second set of candidate positions for embedding ghost speckles into the page image based on said information to be embedded; and embedding black speckles into the page image at positions where they are not near the edges of the page image's text.

A third aspect of the present invention provides a system for enhancing document security and detecting fraud, comprising:
a system for embedding information into an original document and subsequently determining the presence of the embedded information in a copy of the original document; a system for computing a first set of candidate positions for embedding speckles into a digitized image based on information to be embedded, and for computing a second set of candidate positions for embedding ghost speckles into the digitized image based on the information to be embedded, the digitized image having at least one image plane, the at least one image plane being represented by an image array having brightness data for a plurality of pixels, each of said pixels having at least one color component and a pixel position; and a system for embedding the speckles into the digitized image to create a composite image.

A fourth aspect of the present invention provides program product stored on a computer useable medium for enhancing document security and detecting fraud, the computer useable medium comprising program code for causing a computer system to perform the following steps: embedding information into an original document and subsequently determining the presence of the embedded information in a copy of the original document; computing a first set of candidate positions for embedding speckles into a digitized image based on information to be embedded, and for computing a second set of candidate positions for embedding ghost speckles into the digitized image based on the information to be embedded, the digitized image having at least one image plane, the at least one image plane being represented by an image array having brightness data for a plurality of pixels, each of said pixels having at least one color component and a pixel position; and embedding the speckles into the digitized image to create a composite image.

A fifth aspect of the present invention provides a method for enhancing document security and detecting fraud, comprising: providing a computer infrastructure being operable to: embed information into an original document and subsequently determining the presence of the embedded information in a copy of the original document; compute a first set of candidate positions for embedding speckles into a digitized image based on information to be embedded, and to compute a second set of candidate positions for embedding ghost speckles into the digitized image based on the information to be embedded, the digitized image having at least one image plane, the at least one image plane being represented by an image array having brightness data for a plurality of pixels, each of said pixels having at least one color component and a pixel position; and embed the speckles into the digitized image to create a composite image.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 1 shows the Truth Table for the bitwise logical OR operation.

FIG. 2 shows the Truth Table for the bitwise logical AND operation.

FIG. 3 shows the Truth Table for the bitwise logical Exclusive-OR (XOR) operation.

DETAILED DESCRIPTION OF THE INVENTION

The Pseudo-Random Sequence Generator

Figure 4:
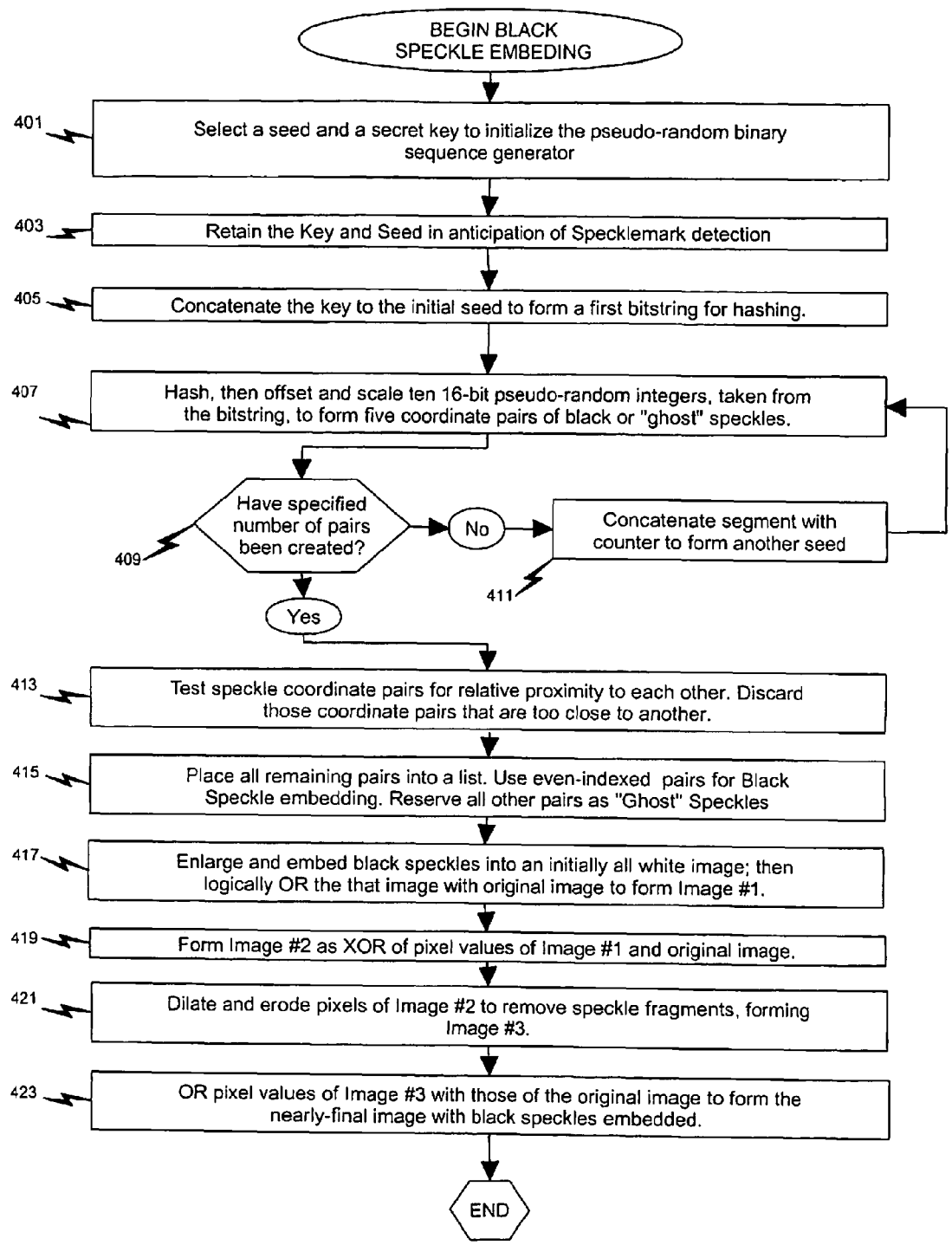
FIG. 4 shows a block diagram of an example method for automatically embedding black speckles into the digitized image of a document page.

A specklemark is created using a cryptographically secure sequence of uniformly distributed pseudo-random binary bits (also called a pseudo-random bitstring). A typical method of generating a secure sequence requires three entities to exist. The first is a specific hashing algorithm that produces an irreversibly hashed bitstring from a given arbitrary sequence of binary bits, herein also called a bitstring. The second is another bitstring, herein called the key, and the third is yet another bitstring herein called the seed. The key is intended to be protected and not revealed where it might be obtained by a malicious party.

Initially, the seed and key are logically combined, generally by concatenating one to the other to form a longer bitstring, and the combined bitstring is hashed by the hashing algorithm to form a first pseudo-random segment; the segment is itself a bitstring of known bitlength. In a typical embodiment, the hashing algorithm used is the Secure Hash Algorithm-Revised (SHA-1). It is documented in Menezes, A. J.; van Oorschot, P. C. and Vanstone, S. A.; Handbook of Applied Cryptography, CRC Press, 1996, which is incorporated herein by reverence in its entirety and for all purposes. SHA-1 reduces a bitstring, x, of finite bitlength into a 160-bit hash of x, herein called a pseudo-random bitstring segment, or segment.

A second segment is produced by using the first segment as its seed. In the preferred embodiment, a 64-bit sequence number, initially set to zero and subsequently incremented for each use, is concatenated to augment the bitlength of the first segment, thus forming a 224-bit augmented seed. The second segment has the same 160-bit length as the first. Each additional segment is created in a like manner, that is, by hashing the augmented preceding segment. This feedback process, where segment n is generated from segment (n−1), can produce an extremely long sequence of uniformly distributed binary bits (estimated to be in excess of $4 \times 10^{32}$ bits for the preferred embodiment using the SHA-1 algorithm) before the sequence repeats itself. Note that all subsequent segments are closely related to and dependent upon the initial seed and the secret key, and the entire sequence of segments can be reproduced at any future time by recalling the key and initial seed.

A number of groups of bits of equal length are sequentially selected from a segment bitstring. In the preferred embodiment, ten groups, each 16 bits in length, are sequentially selected from a segment. The first group is comprised of the leftmost sixteen bits of the bitstring segment that are extracted without rearranging their order. The second group is comprised of the next leftmost sixteen bits, again extracted without rearranging their order, and so on until all ten groups are populated with sixteen sequential bits from the segment. In this manner, none of the bits of any of the ten groups coincides with any bit of another group. Each group represents a 16-bit integer in the domain 0 to 65535. The selection process is repeated using sequential segments until a desired number of 16-bit groups is obtained.

Producing Randomly Located Speckles from the Bit Sequence

As noted above, uniformly sized groups of sequential binary bits, each group 16 bits in length for the preferred embodiment, are taken ten at a time from the very long sequence of pseudo-random bits. The sequential groups are used two at a time, and after offset and scaling become the horizontal and vertical coordinates of the upper left corners of black, white or "ghost" speckles that are to be embedded into the page of text. The horizontal and vertical coordinates of the upper left corner of speckles are called speckle positions. The significance of "ghost" speckles will be explained shortly.

Speckles can be any shape, but for convenience in the preferred embodiment are chosen to be a square of dimension m. If, for example, the pixel resolution is 200 pixels per inch and 200 lines per inch, the value of m might be 3 (a 0.015 inch square) for black and ghost speckles and 4 (a 0.02 inch square) for white speckles, and 100 black and ghost speckles and 200 white speckles might be candidates for embedding into the image of a each page.

Ghost speckles are speckles defined in white areas of an original page that are left white and are therefore expected to remain white. The inclusion of ghost speckles acts as a credibility control during subsequent specklemark detection. Without this credibility control, a bogus scanned suspect image that is completely black might produce a positive detection, with all expected black speckles being found; but all ghost speckles would also be found to be black, which is totally unexpected. Thus, a credible detection of black speckles requires that all, or nearly all, ghost speckles must remain white.

Pixels of white speckles that totally or partially overlap any text character on the page replace the pixels of the text. This action produces small white notches or holes in the text that are useful in subsequent specklemark detection. In the preferred embodiment, however, pixels of black speckles that partially or totally overlap any text character are not used and are discarded because speckle fragments might be ambiguously detectable in subsequent specklemark detection.

Embedding the Specklemark

The illustrative embodiment will use monochrome document pages that themselves contain no embedded images. The document pages will be represented as rasterized images having one binary digit, or bit, per pixel. Those skilled in the art will recognize that the illustrative embodiment using one bit per pixel is readily adaptable to images having more than one bit per pixel and, further, is adaptable to either monochrome or color images.

For illustration of the preferred embodiment, an 8.5 inch by 11 inch page format will be used; a uniform half inch unprinted border will further restrict the printable area of the page to 7.5 inches by 10 inches. Rasterization resolution values used for illustration will be 200 lines per inch and 200 pixels per inch. Those skilled in the art will also recognize that the dimensions and rasterization resolution used for illustrating the preferred embodiment place no limitations whatever on adaptation of the embodiment to other dimensions and rasterization resolutions.

Images of document pages that are to be printed are called original images. In the illustrative embodiment all original images are the same size and will be processed one at a time in a like manner.

The preferred embodiment of the specklemark embedding process begins with conversion of all original images into images that have one bit pixel values, if they are not already in that format. This allows bitwise logical operations to be performed efficiently on groups of pixel values. In the illustrative embodiment, a pixel value of one in the original and final images (final images are those with a specklemark embedded) is to mean a black pixel, and a pixel value of zero is to mean a white pixel. (Note, however, that for various temporary images created in the embedding or detection processes, with such images discarded after their subsequent use, the meaning of the binary pixel value is context dependent and may be reversed). In the following discussion, pixels having a black pixel value will be called black pixels, and pixels having a white pixel value will be called white pixels.

Three bitwise logical operators, OR, AND, and XOR, (the Truth Tables for which are shown in FIGS. 1, 2, and 3, respectively) will be used to combine the binary pixel values of one image with the binary pixel values of another images, all of which images have the same size.

Additionally, the processes of pixel dilation and pixel erosion will be applied. An image to be dilated or eroded is called a subject image. The image produced by the dilation process is called the dilated image, and the image produced by the erosion process is called an eroded image.

A dilated image is composed by initially setting all of its pixels to be white pixels. The dilated image is completed by copying each black pixel in a subject image into an identical location in the dilated image, called a target location. But in the process of copying, the black pixel is enlarged to be a square of black pixels, to be centered at the target location in the dilated image, and all pixels in the dilated image that lie within the square are made black pixels. If the dimension of the enlarging square is an even number, it can not be centered at the target location. In that instance, the enlarging square is centered as nearly as possible, with an even number of pixels to the left side and top of the target location, and an odd number of pixels to the right side and bottom.

An eroded image is composed by initially setting all of its pixels to be black pixels. The eroded image is completed by copying each white pixel in the subject image to an identical location in the eroded image, also called a target location. But in the process of copying, the white pixel is enlarged to be a square of white pixels, to be centered at the target location in the eroded image, and all pixels in the eroded image that lie within the square are made white pixels. If the dimension of enlarging square is an even number, it cannot be centered at the target location. In that instance, the enlarging square is centered as nearly as possible, with an odd number of pixels to the left side and top of the target location, and an even number of pixels to the bottom and right side. Note that the process of erosion is identical to the process of dilation, except that black and white pixels are interchanged, but the approximate centering of enlarged squares of pixels with even numbered dimensions is counter-symmetric.

Creating Random Locations for Black and "Ghost" Speckles

The process of creating random locations for black and ghost speckles that are to be embedded uses a secure pseudo-random sequence generator, as documented above. The process is begun by selecting two bitstrings called the key and the seed. Both bitstrings are retained for reference at a future time should specklemark detection in a suspect page be attempted. The key is retained in a secure manner and not publicly divulged.

Each repeated iteration of the secure pseudo-random sequence generator produces ten 16-bit groups of bits representing ten integers, each having the range 0 to 65535. The ten integers are separated into five pairs, each pair comprised of a horizontal integer a vertical integer. The horizontal integer of the pair is converted by scaling and offset to represent the horizontal pixel coordinate, and the vertical integer of the pair is converted by scaling and offset to represent the vertical pixel coordinate of the upper left corner of the a candidate black or ghost speckle.

In the illustrative embodiment, the black or ghost speckle is chosen to be a square of dimension three. Also, for the example pixel resolution, each horizontal integer is converted by scaling and offset into a horizontal pixel coordinate that lies in the range 100 to 1596, and each vertical integer is converted, by scaling and offset, into a vertical pixel coordinate which lies in the range 100 to 2096, thereby insuring that every square black or ghost speckle lies within or touching a boundary of the example 7.5 inch by 10 inch printable area. Each horizontal pixel coordinate and its associated vertical pixel coordinate constitute a pixel coordinate pair. This process is repeated until a specified number of pixel coordinate pairs is obtained. In the illustrative embodiment, the specified number is 100 pixel coordinate pairs.

The 100 pixel coordinate pairs represent the positions of 100 randomly positioned speckles, of type either black or ghost, that are to be embedded into the image of a document page. However, before the speckles are embedded, they are tested for their proximity one to another, and if any black or ghost speckle would overlap or lay less than a specified distance in any direction (herein called a proximity value) from another speckle, it is discarded. Thus, the proximity testing process may lead to a reduced number of pixel coordinate pairs. In the illustrative embodiment, the specified proximity value is 0.5 inches (100 pixel positions). A side effect of this particular specified proximity test means that absolutely no more than 300 black and ghost speckles can be embedded into the 7.5 inch by 10 inch example printable area.

The reduced number of pixel coordinate pairs is the number that could be embedded into an all white image, and all coordinate pairs are placed into a list. However, only those pixel coordinate pairs having an even-numbered index in the list will be used for embedding black speckles. Those remaining in the list that have odd-numbered indexes, although fully qualified for use, will be retained for use as ghost speckles, and will only be used in the specklemark detection process to be described later.

The Black Speckle Collision Detection Process

A further reduction in the number of pixel coordinate pairs selected for black speckle embedding may occur, in images that contain text, during the process of collision detection. A collision occurs when black speckles overlay text, either fully or partially, that is to be printed on the page. Black speckles that either fully or partially overlay text are discarded.

To begin the preferred embodiment of the black speckle collision detection process, the black speckles that are candidates to be embedded are first enlarged and then embedded into another image that initially has all white pixels and which is the same size as an original image (in the example, 8.5 inches by 11 inches); the image so formed is called the first candidate speckle image. On embedding, the black speckles are enlarged to allow for a boundary between the speckles of the desired size and text that is in an original image. This precludes a black speckle from abutting text. In the illustrative embodiment, the desired 3×3-square speckle size is enlarged to be a 7×7-square speckle. By this means, a two pixel boundary is established around the desired 3×3-square black speckle.

The first candidate speckle image is embedded into a selected original image using a logical-OR operation combining the pixel values of the first candidate speckle image with the pixel values of the original image, and thus forming a first temporary image. Black speckles that do not overlay any text, and any fragments of black speckles that partially overlay text are determined by using a logical EXCLUSIVE-OR operation combining the pixel values of the same original image with the pixel values of the first temporary image, forming a second temporary image.

Black speckle fragments are removed, and the remaining black speckles are resized to their desired final size by the application of pixel erosion followed by pixel dilation. In the illustrative embodiment, each black speckle embedded in the second temporary image will be a 7×7-square of black pixels, 49 pixels in all, and each black speckle fragment will contain fewer than 49 black pixels in a 7×7-square. Erosion is applied to pixels in the second temporary image to form a first eroded image. The erosion applied is a 7:1 erosion, meaning that the size of every white pixel in the second temporary image is replaced by a 7×7-square of white pixels as it is copied to the first eroded image, as described above. This action erodes each 7×7-square of black pixels to one black pixel by removing three pixels from the left side, right side, top and bottom of the 7×7-square, and any cluster of black pixels not containing a full 7×7-square of black pixels is set entirely to white. This results in every black speckle fragment being set entirely to white, and effectively removed.

The remaining embedded black speckles (each now reduced to a single black pixel) are restored to their desired size by dilating the first eroded image to form a first dilated image. This is done in the illustrative embodiment by a 1:3 dilation operation that copies each black pixel in the first eroded image into the initialized first dilated image while enlarging that black pixel to be a 3×3-square of pixels, as described above. Notice that the size of all remaining pixels is simultaneously restored to the desired 3×3 square of black pixels in the first dilated image.

All that is left is to combine the pixels of first dilated image with pixels of the original image, using a logical-OR operation, to create a nearly-final image. A nearly-final image has these properties: 1) all remaining black speckles lay at least two pixels away from any black pixel in the original image, 2) all remaining black speckles are 3×3-square clusters of black pixels, and 3) no black speckles that overlay or partially overlay black pixels in the original image remain.

Black Speckle Embedding Process Summary (Preferred Embodiment)

Referring to FIG. 4, the embedding of black speckles into an original image begins with the creation of a cryptographically secure sequence of uniformly distributed pseudo-random binary bits called a bitstring (using the SHA-1 based method described previously). Bitstring creation begins with the selections of two other bitstrings, the first called the key and the second the seed (401). The sequence is produced 160 bits at a time, and each 160-bit bitstring is called a segment. An entire sequence of segments can be reproduced at any future time by recalling the key and seed. Therefore, the seed and key are retained in anticipation of future specklemark detection (403). Initially, the seed and key are logically combined by concatenation to form a first bitstring to be hashed into a 160-bit first segment (405).

Ten 16-bit integers are sequentially selected from the 160-bit bitstring produced by the hashing process; the integers, used two at a time, and after offset and scaling, become the horizontal and vertical coordinates of the upper left corners of black and ghost speckles that are to be embedded into the original image (407).

If a specified number of coordinate pairs has not been produced (409), another seed is created by using the segment just produced, concatenated to a 64-bit sequence number initially set to zero and subsequently incremented for each use, as a 224-bit augmented seed (411), and that augmented seed is hashed to produce another 160-bit segment. Each additional segment produced in this manner has the same 160-bit length as the first. Additional segments are created by hashing the augmented preceding segment until the specified number of coordinate pairs has been produced.

Each pixel coordinate pair represents the position of a randomly placed speckle, of type either black or ghost, that are to be embedded into the image of a document page. However, before the speckles are embedded, they are tested for proximity one to another, and if any black or ghost speckle would overlap or lay less than a specified distance in any direction from another speckle, it is discarded (413). In most cases, this will reduce the remaining number of coordinate pairs.

The reduced number of pixel coordinate pairs is the number that could be embedded into an all white image, and all of the remaining coordinate pairs are placed into a list. However, only those pixel coordinate pairs having an even-numbered index in the list will be used for embedding black speckles. Those remaining in the list that have odd-numbered indexes, although fully qualified for use, will be retained as ghost speckles to be used only in the specklemark detection process (415).

The black speckles that are candidates to be embedded are first enlarged and then embedded into another image that initially has all white pixels and which is the same size as an original image (417); the image so formed is called the first candidate speckle image. On embedding, the black speckles are enlarged to allow for a boundary between the speckles of the desired size and text that is in an original image.

The first candidate speckle image is embedded into an original image using a logical-OR operation, combining the pixel values of the first candidate speckle image with the pixel values of the original image, and thus forming Image #1 (417).

Black speckles that do not overlay any text, and any fragments of black speckles that partially overlay text are determined by using a logical-XOR operation to combine the pixel values of the same original image with the pixel values of the Image #1, forming Image #2 (419).

Black speckle fragments are removed and the remaining black speckles are resized to their desired final size by the application of pixel erosion followed by pixel dilation, forming Image #3 (421).

Using a logical-OR operation, pixels values of Image #3 are combined with pixel values of the original image to create the nearly-final image (423). The nearly-final image will become the final image after white speckles are embedded.

Creating Random Locations of White Speckles

The process of creating random locations for white speckles that are to be embedded is largely the same as the process for creating black and ghost speckles. The process uses the same secure pseudo-random sequence generator and, in the preferred embodiment, used the same key and seed. However, in the preferred embodiment, additional uniformly distributed 16-bit integers are taken ten at a time from additional 160-bit bitstring segments, as necessary, with the segments lying in sequence beyond those used for the black and ghost speckles and obtained by using additional iterations of the method described before. Each pair of integers is, in turn, converted by scaling and offset into another horizontal pixel coordinate and a vertical pixel coordinate thus forming another pixel coordinate pair, as before. This process is repeated until a specified number of pixel coordinate pairs is obtained. In the illustrative embodiment, the specified number is 200 pixel coordinate pairs.

A larger number (200 for white speckles as opposed to 100 for black and ghost speckles) of potential white speckles is used because the number of black pixels in text documents is relatively small. Usually, black pixels are less than 10% of the total number of pixels in a text image, and they are placed in relatively thin arrangements. Therefore, a larger number of randomly placed white speckles will be discarded because they do not lie within or overlap black areas of the page. No white speckles may be embedded by this method into some pages having text of a small font size.

The 200 pixel coordinate pairs represent the positions of 200 randomly placed white speckles that are to be embedded into black areas within the image of a document page. However, before the speckled are embedded, they are tested for their proximity one to another, as before with black and ghost speckles, and if any speckle would overlap or lay less than a specified proximity in any direction from another speckle, it is discarded. Thus, the proximity testing process may lead to a reduced number of pixel coordinate pairs. As before in the illustrative embodiment, the specified proximity value is 0.5 inches (100 pixel positions).

The number of remaining pixel coordinate pairs is the number that could be embedded into an all black image. A significant further reduction in the number of pixel coordinate pairs selected for speckle embedding is expected to occur during the process of collision detection, that is, by detecting where speckles overlay text, either fully or nearly so, that is to be printed on the page. White speckles that do not fully, or nearly so, overlay text will be discarded.

It will be apparent to those skilled in the art that the coordinate pairs for black and ghost speckles, after collision detection, are mutually exclusive from those for white speckles.

The White Speckle Collision Detection Process

The white speckles that are candidates to be embedded are inverted to black and then embedded into another image that initially has all white pixels and which is the same size as an original image; the image so formed is called the second candidate speckle image. In the illustrative embodiment, a 4×4-square desired white speckle size is used.

The second candidate speckle image is embedded into the same original image using a logical-AND operation combining the pixel values of the second candidate speckle image with pixel values of the original image, thus forming a third temporary image. Speckles that overlay text, and any fragments of speckles that partially overlay text, are evident as black pixels in the third temporary image.

Speckle fragments that are too small to be detected, as a practical matter, are removed, and the remaining speckles are left in their original size by the application of pixel erosion followed by pixel dilation. In the illustrative embodiment, each speckle embedded in the third temporary image will be a 4×4-square of black pixels, 16 pixels in all, and each speckle fragment will contain fewer than 16 black pixels in a 4×4-square. Erosion is applied to pixels in the third temporary image to form a second eroded image. The erosion applied is 3:1, meaning that the size of every white pixel in the third temporary image is replaced by a 3×3-square of white pixels as it is copied to the second eroded image. This action erodes each 4×4-square of black pixels to a 2×2-square of black pixels by removing one pixel from the left side, right side, top and bottom of the 4×4-square. Note that any white speckle fragment cluster not containing a 2×2-square containing at least three black pixels is set entirely to white. In this way speckle fragments are set entirely to white if they are judged to be too small to be reliably detected. The remaining embedded speckles and fragments are restored to their desired size by a 1:3 dilation of the second eroded image to form a second dilated image.

All that is left is to combine the pixels of second dilated image with pixels of the nearly-final image, using a logical-XOR operation, to create a final image. The final image of the illustrative embodiment has the following properties: 1) all remaining black speckles lay at least two pixels away from any black pixel in the original image, 2) all remaining black speckles are 3×3-square clusters of black pixels, and 3) all black speckles that overlay or partially overlay black pixels in the original image have been removed, and 4) all remaining white speckles, or fragments of white speckles, lie within the black areas of the original image and all have at least a 2×2 embedded sub-square containing at least three white pixels.

White Speckle Embedding Process Summary (Preferred Embodiment)

Figure 5:
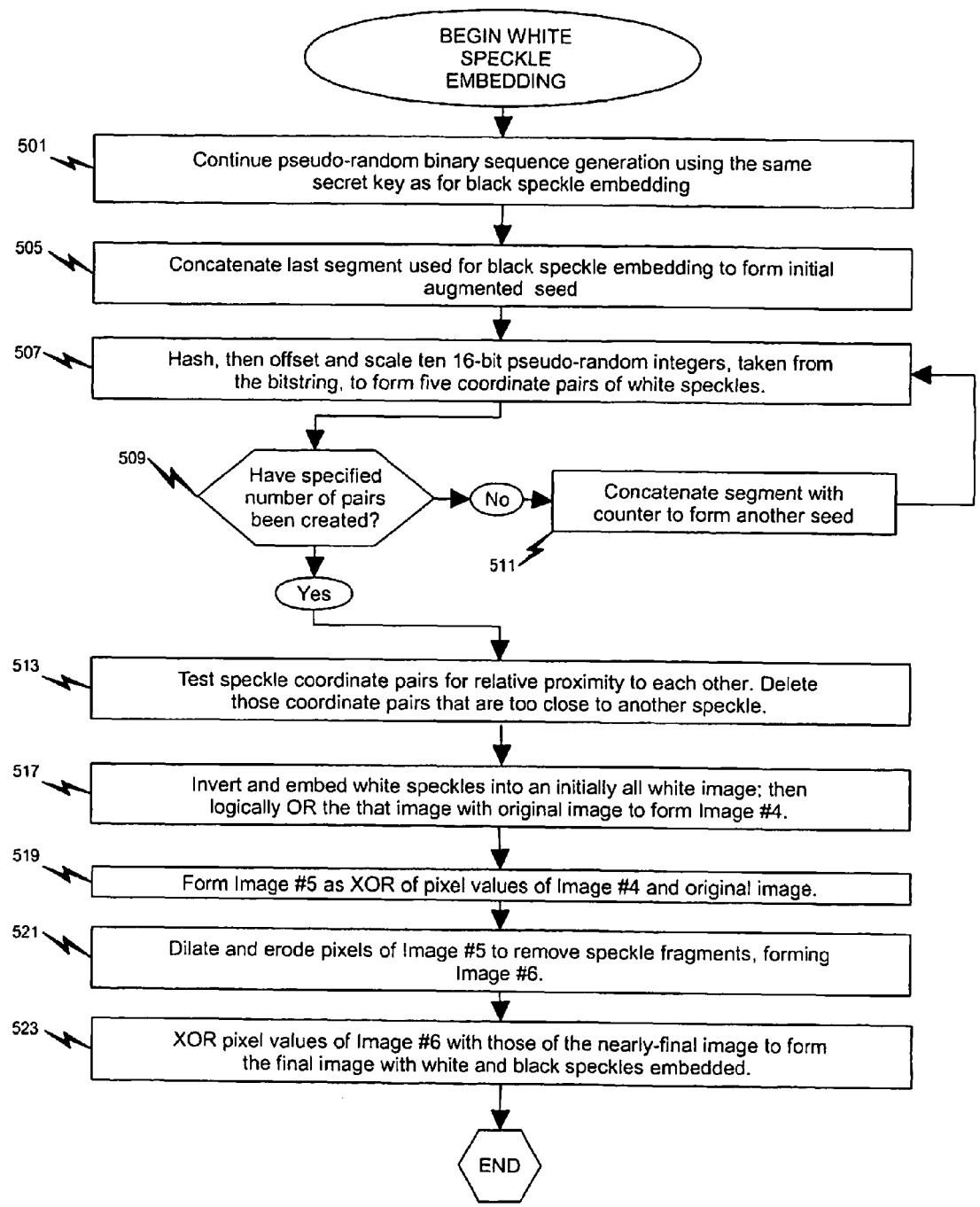
FIG. 5 shows a block diagram of an example method for automatically embedding white speckles into the digitized image of a document page.

Referring to FIG. 5, the process for white speckle embedding is remarkably similar to that for black speckle embedding. The process begins with the continued generation of cryptographically secure segments of uniformly distributed pseudo-random binary bits from where it left off for black speckle embedding. Further segment generation continues use of the same key (501). The initial augmented seed for continued segment generation is composed by incrementing and concatenating the previously used 64-bit binary counter to the last segment used for black speckle embedding (505). In this manner the continuing sequence of segments can be reproduced at any future time by recalling the initial key and seed, and further, integers extracted from continuing segments will be distinct from those used for black speckle embedding. Thus black and white speckle coordinate pairs will not coincide.

Ten 16-bit integers are sequentially selected from the 160-bit bitstring produced by the hashing process; the integers, used two at a time, and after offset and scaling, become the positions of white speckles that are to be embedded into the original image (507).

If a specified number of coordinate pairs has not been produced (509), another augmented seed is created by using the previous segment, concatenated to a 64-bit sequence number incremented before each use (511), and that augmented seed is hashed to produce another 160-bit segment. Each additional segment is created by hashing the augmented preceding segment, until the specified number of coordinate pairs has been produced.

Each pixel coordinate pair represents the position of a randomly placed white speckle that is to be embedded into the image of a document page. However, before the speckles are embedded, they are tested for proximity one to another, and if any white speckle would overlap or lay less than a specified distance in any direction from another white speckle, it is discarded (513).

The number of remaining pixel coordinate pairs is the number that could be embedded into an all black image, and all of the remaining coordinate pairs are placed into a list.

The white speckles that are candidates to be embedded are inverted to have black pixels and then embedded into another image that initially has all white pixels and which is the same size as an original image (517); the image so formed is called the second candidate speckle image.

The second candidate speckle image is embedded into an original image using a logical-OR operation, combining the pixel values of the second candidate speckle image with pixel values of the original image, and thus forming Image #4 (517).

Inverted-white speckles that do not overlay any text, and any fragments of inverted-white speckles that partially overlay text are determined by using a logical XOR operation to combine the pixel values of the same original image with the pixel values of the Image #4, forming Image #5 (519).

Inverted-white speckle fragments are removed by the application of pixel erosion followed by pixel dilation, forming Image #6 (521).

Using a logical-XOR operation, pixels values of Image #6 are combined with pixel values of the nearly-final image (which has previously embedded black speckles) to create the final image (523).

Alternatively Creating Locations of White Speckles with Manual Assistance

The process of creating white speckles can be manually assisted. To do this, a copy of the original image is brought into an image editor, such as Adobe Photoshop®. Small black areas of the text are manually removed by visually isolating areas of interest and changing their pixel values from black to white, thus creating a manually altered image. In the preferred embodiment, the manually altered areas are rectangles. By making the altered areas rectangles, the automated processes already described can be used to qualify the areas as being sufficiently large to be detectable. Logically combining pixels values of the manually altered image with pixels values of the original image using a logical-XOR operation produces another candidate speckle image, called the fourth candidate speckle image.

As with the automatically created candidate white speckles, a further reduction in the number of pixel coordinate pairs for speckle embedding is expected to occur during the process of collision detection, and as before, by detecting where speckles that overlay text, either fully or nearly so. White speckles that do not fully, or nearly so, overlay text will be discarded.

The use and purpose of the third candidate speckle image is identical to the previously defined and used second candidate speckle image.

Speckle fragments in the third candidate speckle image that are too small to be detected, as a practical matter, are removed, and the remaining speckles are left in their original size by the application of pixel erosion followed by pixel dilation. In the illustrative embodiment, each white speckle to be embedded must be at least as large as a 4×4-square of pixels, but each speckle fragment may contain fewer than 16 pixels in a 4×4-square.

Applying erosion and dilation, as described before, creates a third dilated image in which all speckles equal to or larger than a 4×4-square are retained (and appear as clusters of black pixels), but any speckle fragment cluster not containing a 2×2-square having at least three black pixels is set entirely to white. In this way speckle fragments are set entirely to white if they are judged to be too small to be reliably detected.

All that is left is to combine the pixels of third dilated image with pixels of the nearly-final image as before, using a logical-XOR operation, to create a final image. The final image of the illustrative embodiment has the following properties: 1) all remaining black speckles lay at least two pixels away from any black pixel in the original image, 2) all remaining black speckles are 3×3-square clusters of black pixels, 3) all black speckles that overlay or partially overlay black pixels in the original image have been removed, and 4) all remaining white speckles, or fragments of white speckles, lie within the black areas of the original image and all have at least a 2×2 embedded sub-square containing at least three white pixels.

By searching the third dilated image, equivalent pixel coordinate pairs of the positions of the manually embedded white speckles can be cataloged. This catalog of pixel coordinate pairs, along with the sizes of the manually embedded pixels must be retained with the original image for use during subsequent white speckle detection, since it can not be reproduced reliably. Equivalently, the third dilated image can be retained with the original image instead.

Manually Assisted White Speckle Embedding Summary

Figure 6:
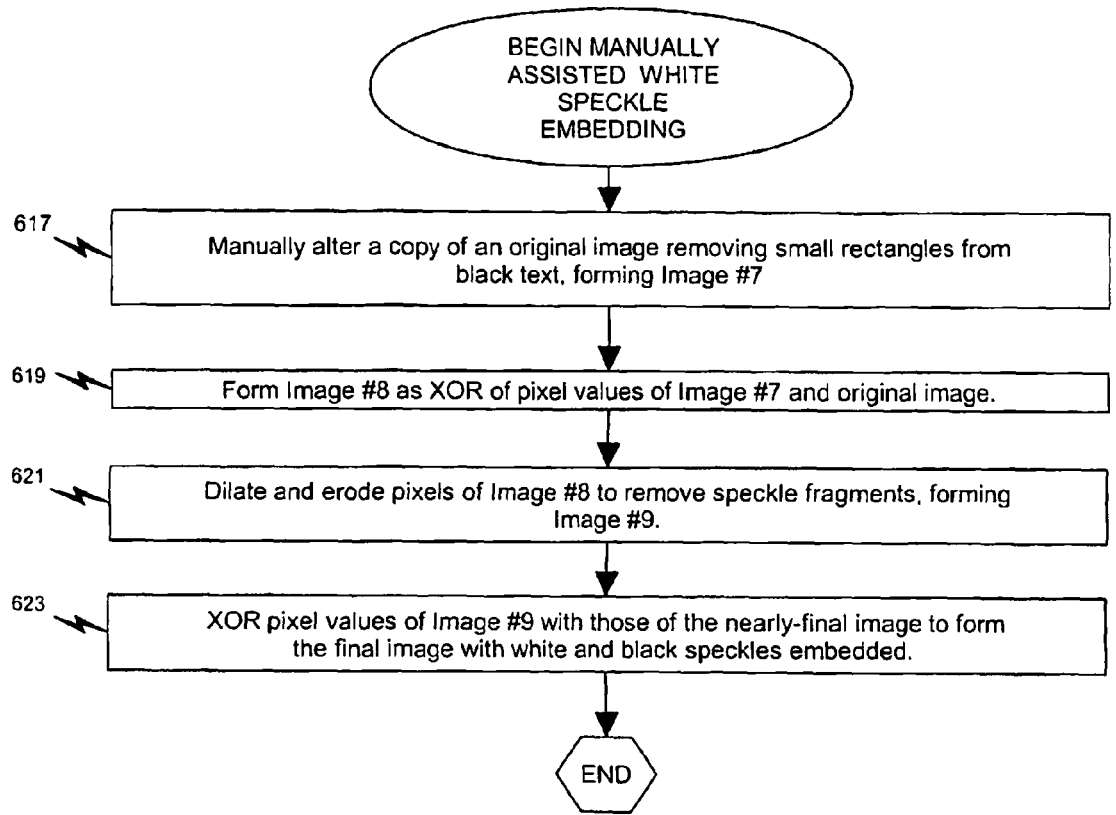
FIG. 6 shows a block diagram of an example alternative manually-assisted method for embedding white speckles into the digitized image of a document page.

The manually assisted alternative process for white speckle embedding is identical in many aspects to the fully automatic process discussed previously. Referring to FIG. 6, the manually assisted process begins with alteration of a copy of an original image using an image editor. Alteration consists of the removal of small rectangles of black pixels from the original image copy (617). This alteration results in the creation of small white holes or notches in the text or other geometric patterns in the image. The manually altered image is called Image #7.

Pixel values of Image #7 are combined with pixel values of the same original image, using a logical XOR operation, to produce Image #8 (619). Image #8 has pixel values that are all white except for the manually removed areas, which appear as areas of black pixels.

Manually created white speckle are subjected to the same fragment deletion process as was applied to the automatically created white speckles. Speckle fragments and speckles judged too small to be detectable are removed by the application of pixel erosion followed by pixel dilation, forming Image #9 (621).

Using a logical-XOR operation, pixels values of Image #9 are combined with pixel values of the nearly-final image (which has previously embedded black speckles) to create the final image including the specklemark. (623).

Note that a similar manually assisted process can be defined for embedding black speckles, but it is not recommended as a preferred embodiment.

The process of speckle embedding is repeated for each original image of a page in the document. Variations of the method are possible. For instance, each original image can have the same speckle pattern embedded, or each can have a uniquely different speckle pattern embedded that was produced using the same key but a different seed. The number and size of speckles can be varied from page to page, and/or from document copy to document copy. Other variations will be apparent to those skilled in the art that are within the scope and intent of the present invention.

Detecting the Specklemark

Specklemark detection is begun by scanning a suspect page that is believed to have an embedded specklemark, thus forming a digitized image, unless the suspect page already exists as a digitized image. In either case, the image is called the suspect image. In the illustrative embodiment, the suspect image is a monochrome image having 8-bit pixel values. In preparation for detection of a particular specklemark in the suspect image, the corresponding original image of the page is either recalled or regenerated. Additionally, the retained key and at least one expected seed which could be expected to be found in the suspect image are recalled.

An aligned suspect image is formed by geometrically aligning the suspect image with its corresponding original image using methods described in U.S. Pat. No. 6,571,021 B1, May 27, 2003, RECOVERING AN INVISIBLE DIGITAL IMAGE FROM A DISTORTED IMAGE REPLICA, which is included herein by reference in its entirety and for all purposes. In the preferred embodiment, pixels values of the aligned suspect image are converted from 8-bit values to 1-bit values. In the illustrative embodiment, the conversion is done by rudimentary thresholding, that is, if an 8-bit pixel value is larger than 128, its corresponding 1-bit pixel value is set to 0 (a white pixel), otherwise, its corresponding 1-bit pixel value is set to 1 (a black pixel). It should be understood that other known technologies for alignment could be employed under the present invention.

In significant parts, the methods used in preparation for detection of a specklemark in the aligned suspect image are similar or identical to those methods used for specklemark embedding.

Black Speckle Detection

The process of creating random locations for speckles that are expected to be found in the aligned suspect image must use the same secure pseudo-random sequence generator as used for embedding. The required key and at least one of several seeds used to mark individual copies of the original document are recalled, as are the number of candidate black and white speckles that were candidates for embedding, and the distance chosen for proximity discarding.

For the key and the selected seed, the number of pixel coordinate pairs that represent the positions of randomly placed speckles (either black or ghost) are generated again. The method of generation is and must be identical to that described previously for speckle embedding. As was the case for the illustrated embodiment of embedding, 100 black and ghost candidate coordinate pairs are generated for detection.

Also as described previously for speckle embedding, the speckles coordinate pairs are tested for their proximity one to another, and if any speckle would overlap or lay less than a specified distance in any direction from another speckle, it is discarded. The reduced number of qualified coordinate pairs is placed in a list, as before.

For black and ghost pixels, the reduced number of pixel coordinate pairs is the number that could be embedded into an all white image. All of the reduced number of pixel coordinate pairs in the list will be used for speckle detection, as opposed to using only those pixel coordinate pairs having an even-numbered index in the list for speckle embedding.

As in the specklemark embedding process, a further reduction in the number of black and ghost pixel coordinate pairs may occur in images that contain text during the process of collision detection.

In the specklemark detection process, as in the specklemark embedding process, all candidate speckles are first enlarged and then embedded into another image that initially has all white pixels and which is the same size as an original image; the image so formed for speckle detection is called the fourth candidate speckle image. On embedding, the all speckles are enlarged to allow a boundary between the speckles of the desired size and text that is in an original image. As before in the illustrative embodiment, the 3×3-square desired speckle size is enlarged to be a 7×7-square speckle. By this means, a two pixel boundary is established around the desired 3×3-square black speckle.

The fourth candidate speckle image is embedded into the recalled original image using a logical-OR operation, thus forming a fourth temporary image. Speckles that do not overlay any text, and any fragments of speckles that partially overlay speckles are determined by using a logical XOR operation combining the pixel values of the original image and the pixel values of the fourth temporary image, forming a fifth temporary image.

Speckle fragments are removed, and the remaining speckles are resized to their desired final size by the application of pixel erosion followed by pixel dilation of the fifth temporary image. The erosion and dilation process leads to formation of another image, called the black detector image. Notice that all non-colliding speckles are restored to be squares of black pixels in the black detector image, similar to the first dilated image. But unlike the first dilated image, it is desirable to enlarge the speckles in the black detector image. In the illustrative embodiment, they are enlarged to be 5×5-squares instead of 3×3-squares to allow a small measure of margin. The margin is warranted since the black detector image is to be used as a mask when combined with the aligned suspect image, which may be imperfectly aligned with the original image.

The black detector image contains non-colliding speckles that result from using all of the reduced number of pixel coordinate pairs, as opposed to the smaller number of non-colliding speckles resulting from using only those pixel coordinate pairs having an even-numbered index, as used for black speckle embedding.

The pixel coordinate pairs in the list that have odd-numbered indexes result in "ghost" speckles that serve as a credibility check for speckle detection. Since the ghost speckles were never embedded, and since all ghost speckles that collide with text were removed, the detection process should find only white at those speckle locations. Without this credibility check, a bogus image having all black pixels substituted for the original image would give a strong, but false, specklemark detection, because all black speckles expected would be found. But the included ghost speckles, supposed to be white, would also show as black and statistically disqualify the false detection.

At this juncture, the process of detection of a specklemark diverges from the process of embedding a specklemark. A list of the coordinate pairs of surviving speckles (called the surviving speckles-list) is determined from a pixel by pixel search of the black detector image and recording the upper-left coordinate pairs of every speckle found. By referencing the list of remaining pixel coordinate pairs as it existed before collision detection (called the qualified-speckles list), the coordinate pairs of each surviving speckle can be placed into one of two categories. A coordinate pair in the surviving-speckles list that is the same as a coordinate pair in qualified-speckles list having an even-numbered index in the qualified-speckles list is placed into the "Black-Speckle-Expected" category, and all other coordinate pairs in surviving-speckles list are placed into the "Ghost-Speckle-Expected" category.

Finally, pixel values of the black detector image are combined with pixel values of the aligned suspect image using a logical-AND operation to create a black detection image. A pixel by pixel search of the black detection image reveals all black pixels that lie in both the aligned suspect image and the black detector image. The coordinates of those pixels are tested against the categorized surviving pixel coordinate pairs to see if they are "related to" a "Ghost-Speckle-Expected" or a "Black-Speckle-Expected" coordinate pair. A count of "Black-Speckles-Found", initially set to zero, is incremented if a speckle is related a Black-Speckle-Expected, and a count of "Corrupted-Ghost-Speckles-Found", also initially set to zero, is incremented if a speckle is related a Ghost-Speckle-Expected.

The term "related to" as used herein means that detected black pixels are within a small distance from the surviving coordinate pair. Since the aligned suspect image is probably imperfectly aligned with the original image, a small misalignment tolerance is warranted. Note that an allowable misalignment tolerance is limited by the dilation used in the black detector image; in that image, dilated speckles are 5×5 squares of pixels for the illustrative embodiment.

A perfect detection will find all expected black speckles and no ghost speckles that are not white. Testing of each found speckle is a statistical event, and finding an expected speckle of the correct color, black or white, is a true event. Finding an expected ghost speckle of the incorrect color is a false event. A less than perfect detection, where not all expected black speckles are found and/or some ghost speckles are found to be black, are statistical events that are combined to determine the probability of detection of a specific specklemark. If a statistically significant number of black speckles found in the aligned suspect image match those in the black detector image, and if a statistically significant number of ghost speckles in the black detector image remain white in the aligned suspect image, then the joint probability of detection of a specklemark is mathematically determinable, and asymptotically approaches either 1 (detection) or 0 (no detection).

Black Speckle Detection Summary (Preferred Embodiment)

Figure 7A:
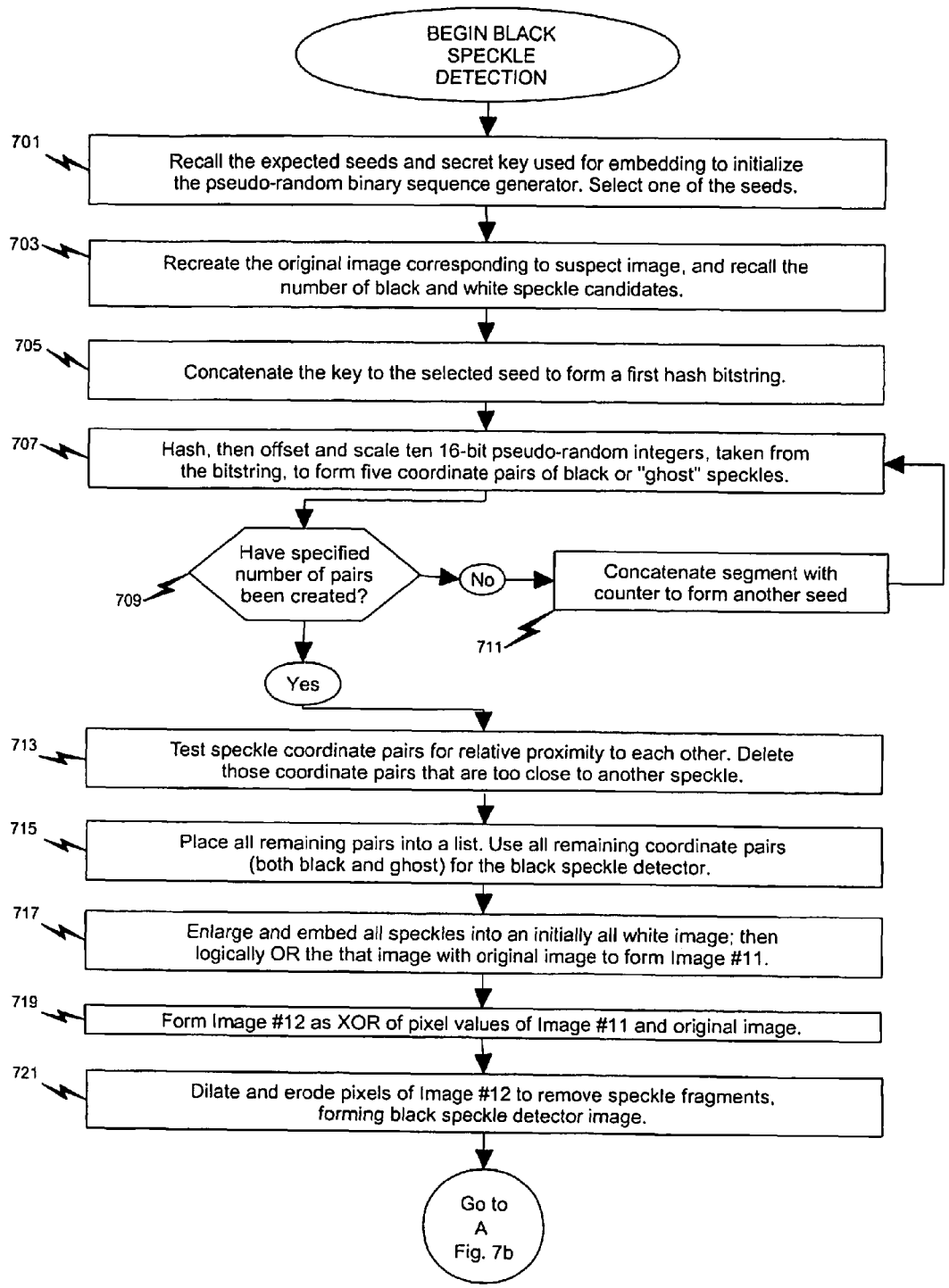
FIG. 7a and the continuing FIG. 7b show a block diagram of an example method for detecting embedded black speckles in the digitized image of a document page.

Referring to FIG. 7a, the detection of black speckles in a suspect image begins with the recreation of a cryptographically secure bitstring of uniformly distributed pseudo-random binary bits. The recreation is begun by recalling the key known to have been used for embedding the specklemark in the suspect image, and several seeds, each seed used to mark one of several copies of the original image. Select one of the seeds (701). Specklemark detection will be repeated using one seed at a time until a specklemark is unequivocally detected, or until no untried seeds remain; the latter being a failure to detect an expected specklemark.

Additionally, the original image that corresponds to the suspect image is recreated (or recalled if it were saved as an image), and the specified number of coordinate pairs for black and white speckle candidates are recalled (703).

The key and the selected seed are combined by concatenation to form a first bitstring (705) to be hashed into a first 160-bit segment.

Ten 16-bit integers are selected in sequence from the 160-bit bitstring produced by the hashing process. The integers, used two at a time, and after offset and scaling, become the positions of candidate black and "ghost" speckles to be embedded into the black detector image (707).

If the specified number of coordinate pairs has not been produced (709), an augmented seed is created by using the previous segment concatenated to a 64-bit sequence number initially set to zero and subsequently incremented for each use (711). Each augmented seed is hashed to produce another 160-bit segment. Each additional segment produced in this manner has the same 160-bit length as the first. Additional segments are created in this manner until the specified number of coordinate pairs has been produced.

Each pixel coordinate pair represents the position of a randomly placed speckle, of type either black or ghost, that is expected to be found in the suspect image. However, before the speckle coordinates are used to create a black speckle detector, they are tested for proximity one to another, and if any black or ghost speckle would overlap or lay less than a specified distance in any direction from another speckle, it is discarded (713).

The remaining pixel coordinate pairs represent the corners of speckles that could be embedded into an all white image, and all of the remaining coordinate pairs are placed into a list. All pixel coordinate pairs in the list will be used for embedding black speckles in a black speckle detector. (715).

All speckles, of both black and ghost types, that are to be embedded into the detector are first enlarged and then embedded into another image that initially has all white pixels (717); the image so formed is called the fourth candidate speckle image. On embedding, the black and ghost speckles are enlarged to allow tolerance of an imperfectly aligned suspect image.

The fourth candidate speckle image is embedded into an original image using a logical-OR operation, combining the pixel values of the fourth candidate speckle image with the pixel values of the original image, and thus forming Image #11 (717).

Black and ghost speckles that do not overlay any text, and any fragments of black and ghost speckles that partially overlay text are determined by using a logical-XOR operation to combine pixel values of the original image with the pixel values of the Image #11, forming Image #12 (719).

Black and ghost speckle fragments are removed from Image #12 and the remaining black and ghost speckles are resized to their desired final size by the application of pixel erosion followed by pixel dilation, forming the black speckle detector image (721).

Figure 7B:
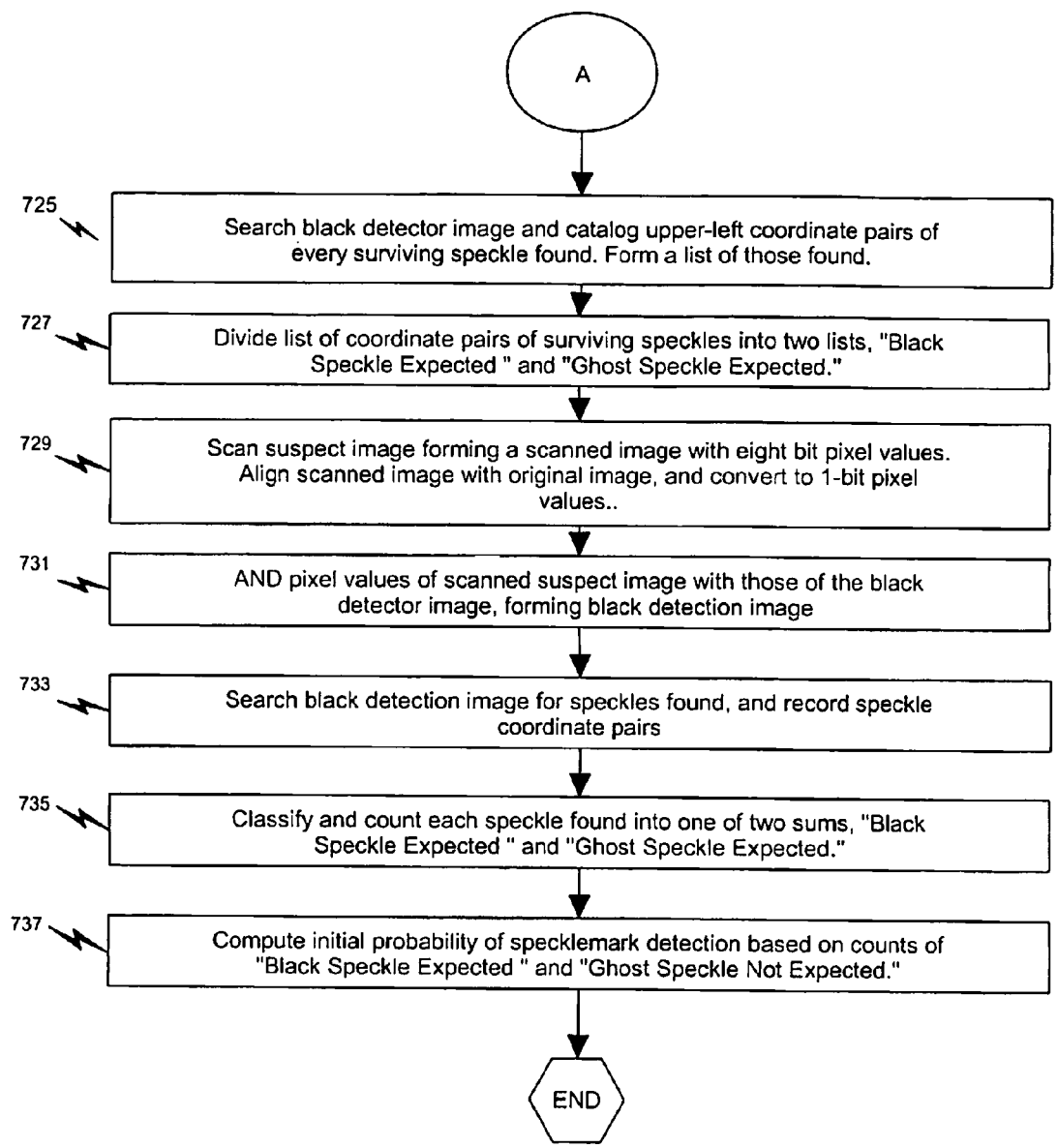

Proceeding on to FIG. 7b, a list of the coordinate pairs of surviving speckles (non-colliding speckles, either black or ghost) is determined from a pixel by pixel search of the black speckle detector image; the upper-left coordinate pairs of every speckle found is recorded in a surviving speckles list (725). By referencing the list of remaining pixel coordinate pairs as it existed before collision detection, (as in 715) the coordinate pairs of surviving speckles can be placed into two categories. The coordinate pair of a surviving speckle that is the same as a coordinate pair in the remaining coordinate pairs list, and that has an even-numbered index in the remaining coordinate pairs list, is placed into the "Black-Speckle-Expected" category; all other coordinate pairs of surviving speckles are placed into the "Ghost-Speckle-Expected" category (727).

The suspect image is scanned and re-digitized, if necessary, to form an image having 8-bit pixel values. The scanned suspect image is then geometrically aligned with the original image, and, after alignment, its pixel values are converted from 8-bit to 1-bit values (729).

Finally, pixels of the black detector image are combined with pixels of the aligned suspect image using a logical-AND operation to create a black detection image (731). A pixel by pixel search of the black detection image reveals all black pixels that lie in both the aligned suspect image and the black detector image (733). The coordinate pairs of those pixels are tested against the categorized surviving pixel coordinate pairs to see if they are "related to" a "Ghost-Speckle-Expected" or a "Black-Speckle-Expected" coordinate pair; counts of the two categories of pixel coordinate pairs are made (735). Based on the counts of the two categories, an initial probability of specklemark detection is made (737), which will be revised once white speckles are detected and included.

White Speckle Detection

The process for detecting white speckles also requires reconstruction of the pattern of white speckles in the specklemark, much the same way as the detection of black speckles required reconstruction of the pattern of black speckles. However the reconstruction for the pattern of white speckles is more nearly the same as that used for their embedding because, in the preferred embodiment, there are no equivalent ghost speckles that apply to white speckles.

If white speckles were manually embedded into a copy of the original image, the set-aside catalog of equivalent pixel coordinate pairs of the positions of the manually embedded white speckles, and their embedded sizes, are recalled. Together they are used to create an image equivalent in form and function to the white detector image. Equivalently, if the entire dilated image used for white speckle embedding was set-aside with the original image, it can be used with minor alteration as the white detector image. The alteration shrinks the size of embedded speckles using the erosion process to tolerate slightly imperfect alignment of the aligned suspect image.

Otherwise, the process of creating random locations for white speckles expected in the suspect image uses the same secure pseudo-random sequence generator and, in the preferred embodiment, uses the same key and selected seed as was used for black speckle detection.

The same specified number of 200 pixel coordinate pairs is used for white speckle detection as for white speckle embedding in the illustrative embodiment. All remaining process steps of the detection process are identical to steps of the embedding process up to creation of the dilated image (which here is the white detector image). Speckles in the white detector image are shrunk as they are restored in the dilation process, rather than enlarged as they were for the black detector image. The reasoning is the same, however, since shrinking the speckles in the white detector image equivalently provides a tolerance of slight imperfection in alignment of the aligned suspect image.

The equivalent dilated image is called the white detector image for the detection process. Speckles that overlay text, and any sufficiently large fragments of speckles that partially overlay text, are evident as black pixels in the white detector image. All remaining speckles, or fragments of speckles, have at least a 2×2 embedded sub-square containing at least three black pixels in the white detector image.

At this juncture, the process of detection of white speckles diverges from the process of embedding white speckles. A list of the coordinate pairs of surviving white speckles (non-colliding speckles) is determined by a pixel by pixel search of the white detector image while recording the upper-left coordinate pairs of every inverted-white speckle found.

Finally, pixels of the aligned suspect image are inverted, black to white and vice versa) to form a sixth temporary image. Pixels of the white detector image are combined with pixels of the sixth temporary image using a logical-AND operation, creating the white detection image. A pixel by pixel search of the white detection image reveals any black pixels. Black pixels "related to" surviving white speckle coordinate pairs represent successful detection of white speckles. Counts of white speckles detected are used to statistically help determine the probability of detection of a specific specklemark.

White Speckle Detection Summary (Preferred Embodiment)

Figure 8A:
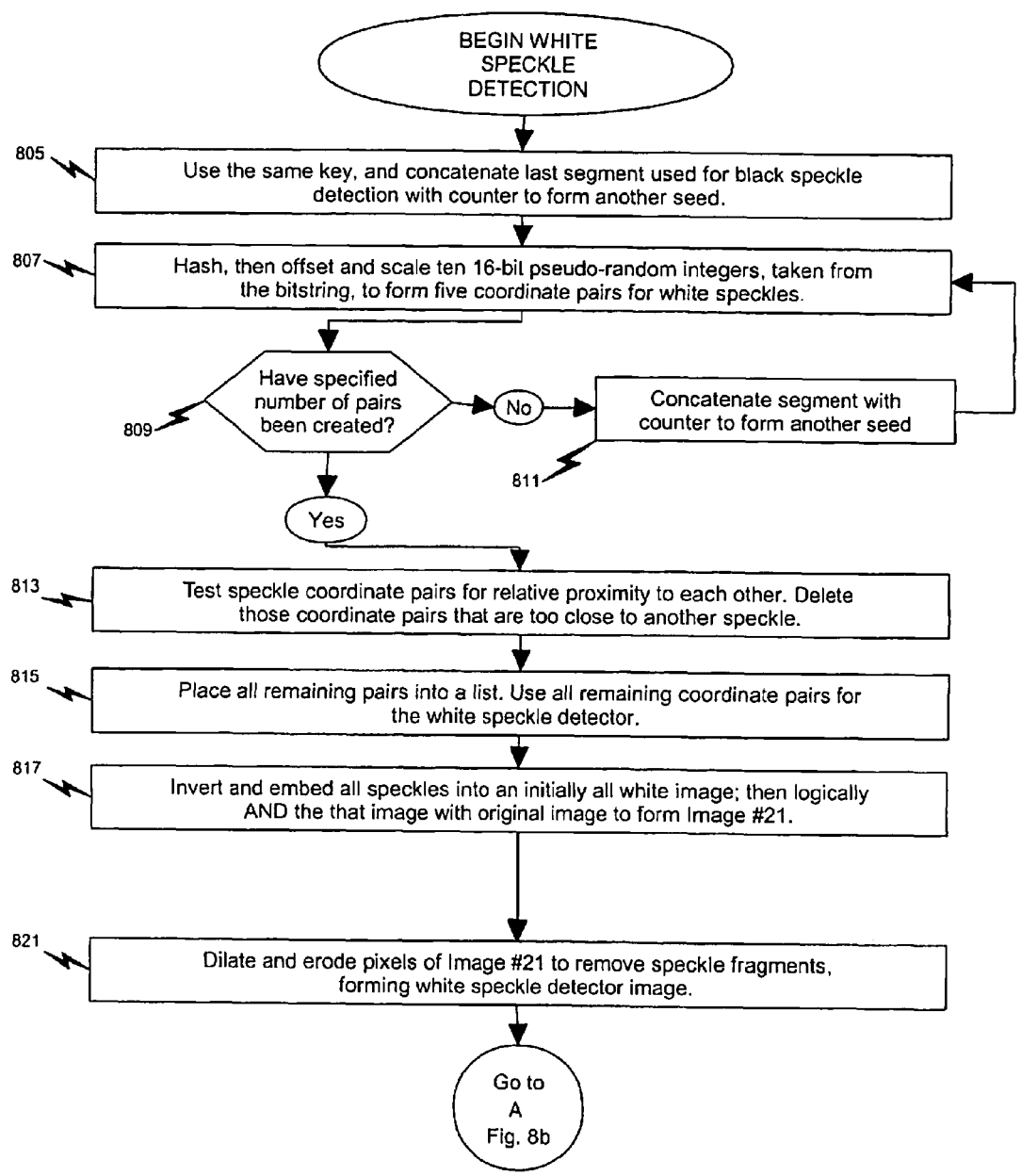
FIG. 8a and the continuing FIG. 8b show a block diagram of an example method for detecting embedded white speckles in the digitized image of a document page.

Referring to FIG. 8a, the detection of white speckles in a suspect image begins with the continuation of a cryptographically secure bitstring of uniformly distributed pseudo-random binary bits that was used for black speckle detection. The continuation uses the same key as used for black speckle detection. In addition, the same original image that corresponds to the suspect image, and the specified number of coordinate pairs for white speckle candidates, previously recalled, are used [see FIG. 7a: (703)].

The first augmented seed is created by using the last segment produced for black speckle detection, concatenated to a 64-bit sequence number that was initially set to zero and has been subsequently incremented for each use, as a 224-bit augmented seed (805). The first augmented seed is concatenated to the key, and that combined bitstring is hashed to produce another 160-bit segment (807). Using a continuation of the pseudo-random binary bitstring essentially assures that white speckle coordinate pairs are very unlikely to be the same as black speckle coordinate pairs.

As before, ten 16-bit integers are selected from the 160-bit bitstring produced by the hashing process; the integers, used two at a time and after offset and scaling, become the positions of speckles that are to be embedded into the white detector image (807).

If the specified number of coordinate pairs has not yet been produced (809), another augmented seed is created by using the segment just produced, concatenated to an incremented 64-bit sequence number (811), and that augmented seed is hashed to produce the next 160-bit segment.

Each pixel coordinate pair represents the position of a randomly placed white speckle that is expected to be found in the suspect image. However, before the speckle coordinates are used to create a white speckle detector, they are tested for proximity one to another, and if any white speckle would overlap or lay less than a specified distance in any direction from another speckle, it is discarded (813).

The remaining pixel coordinate pairs are those that could be embedded into an all black image, and all of the remaining coordinate pairs are placed into a list. All pixel coordinate pairs in the list will be used for embedding black (inverted-white) speckles into a white speckle detector. (815).

All pixels of all white speckles that are to be embedded into the detector are inverted, white to black and vice versa; the inverted speckle is then embedded into another image that initially has all white pixels (817); the image so formed is called the fifth candidate speckle image.

The fifth candidate speckle image is embedded into an original image using a logical-AND operation, combining the pixel values of the fifth candidate speckle image with the pixel values of the original image, and thus forming Image #21 (817). Inverted-white speckles that do overlay any text, and any fragments of inverted-white speckles that partially overlay text are evident in Image #21.

Inverted-white speckle fragments not sufficiently large are removed from Image #21 and the remaining inverted-white speckles are resized to their desired final size by the application of pixel erosion followed by pixel dilation, forming the white speckle detector image (821).

Figure 8B:
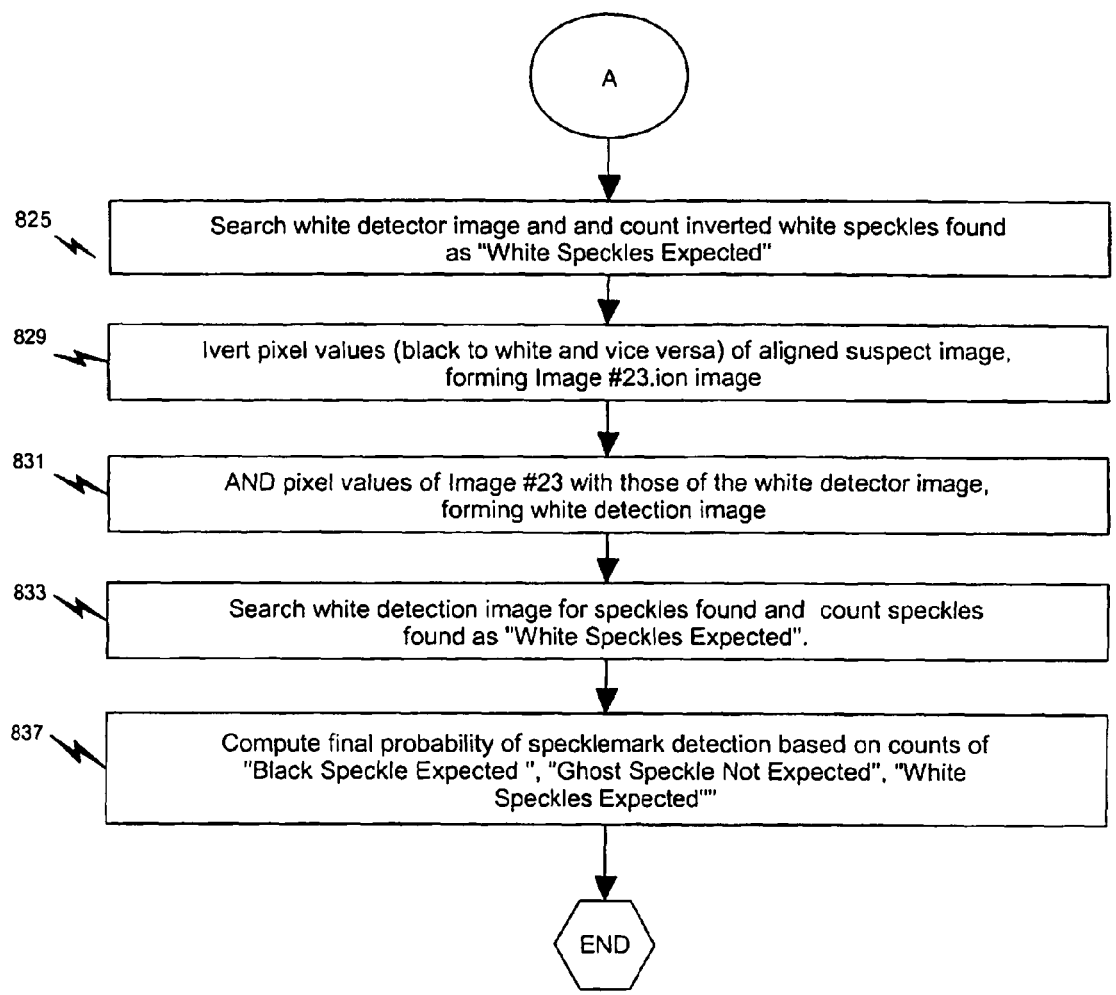

Proceeding on to FIG. 8b, a count of surviving speckles is determined from a pixel by pixel search of the white speckle detector image; speckles in this category are called "White-Speckles-Expected" (825).

Finally, the pixels of the aligned suspect image are inverted, (black to white and vice versa) to form Image #23, and pixel values of the white detector image are combined with pixel values of Image #23 using a logical-AND operation to create a white detection image (831).

A pixel by pixel search of the white detection image reveals all non white speckles that lie within the white detector image, and these are counted as a category of "White-Speckle-Found" (833). Based on the count of speckles in the category "White-Speckles-Found", and the previous categories "Black-Speckles-Found" and "Corrupted-Ghost-Speckles-Found," a final probability of specklemark detection can be made (837).

As before, testing for each expected speckle, black, white, or ghost, is a statistical event, and finding an expected speckle of the correct color, black or white, is a true event. Finding an expected speckle of the incorrect color is a false event. These statistical events of the white detection process add to those of the black detection process and together are used to form the joint probability of specklemark detection, as illustrated below.

If the detection methods described above are applied to each page of a several-page document, the accumulated number of expected and detected black and white speckles and the expected lack of detected ghost speckles relative to their expected sums for the several pages further strengthen the statistic of detection, even if malicious attempts have been made to remove some, but not all, of the black and white speckles with White-Out® and black ink.

Determining the Probability of Specklemark Detection

Determining the probability of specklemark detection in a suspect image is based on the joint probabilities of detecting individual embedded speckles of types black, white and ghost. The most reliable speckles, in terms of their relative immunity to malicious tampering, are ghost speckles. In the preferred embodiment through careful construction, ghost speckles are assured of having several desirable properties that enhance their use in determining the probability of specklemark detection. These desirable properties are: 1) each ghost speckle is placed in an unpredictably random position within the page image, and there are no discernable clues as to that position; 2) each ghost speckle does not overlay text, either totally or partially; 3) each ghost speckle is assured of being at least a first specified distance in every direction from text; and 4) all ghost speckles are assured of being at least a second specified distance in any direction from each other and from any black speckle.

Corruption of a ghost speckle in a re-digitized suspect page image can be caused only by a small number of unlikely events. Such events are: 1) a malfunction of the printer that caused a splotch to be printed on top of a ghost speckle, 2) a visible defect in the paper on which the page image was printed at the location of a ghost speckle, 3) a significant misalignment of the suspect page image with respect to the page image causing misaligned text to encroach on a ghost speckle, or 4) by the blunder of selecting the wrong corresponding page image.

Given the above characteristics and properties of ghost speckles, the preferred embodiment employs the reasonable and conservative estimate of the probability of detection a corrupted ghost speckle, $p_U$, to be n/N, where N is the number of ghost speckles embedded and n is the number of corrupted ghost speckles found. Further, maximum and minimum limits are placed on $p_U$ such that $p_U=\min\{\max(1/N, n/N),[N-1]/N\}$.

The preferred embodiment further presumes that the probability distribution for detection of a corrupted ghost speckle is a binomial distribution. Hence, the expected mean, m, is $m=p_U \times N$; the variance, v, of the distribution is $v=N \times p_U[1-p_U]$; and the standard deviation, $\sigma$, is a $\sigma=\sqrt{v}$.

For the purposes of speckle detection in the preferred embodiment, the statistics governing the detection of speckles on an unspeckled page are presumed to be the same as the statistics of ghost speckles, as described above. A specklemark detection is determined to occur when the sum of black and white speckles detected, $S_{B\&W}$, is equal to or greater than the mean plus ten standard deviations, or $S_{B\&W} \geq 10\sigma+m$.

Three example scenarios will be given.

Scenario #1: An initial 100 candidate speckles are specified. After mutual proximity eliminations, the reduced number of speckles is 90, and after text collision eliminations the remaining number of speckles is 80. The number of ghost speckles would therefore be 40 and the number of black speckles embedded would be the remaining 40. If no corrupted ghost speckles were detected in a suspect page image, the number of black and white speckles detected in that same page image would need to be at least 11 for a "specklemark found" declaration. [In this example, $p_U=1/40=0.025$; $m=40\times 0.025=1$; $v=0.025\times 40\times 0.975=0.975$; $\sigma=0.987$; and the number of detected black and white speckles needed to declare a detection is $S_{B\&W} \geq 10\times 0.987+1=10.87$].

Scenario #2: Scenario #2 is identical to Scenario #1 except that a bogus entirely black suspect page is used. The bogus suspect page image causes all 40 ghost speckles to be corrupted, all 40 black speckles to be detected, and no white speckles to be detected. However, the number of black and white speckles detected would need to be at least 49 for a specklemark detection to be declared. Since only 40 black speckles were embedded, and since no additional white speckles can be detected, a declaration of "specklemark not found" is made for the bogus suspect page. [In this example, $p_U=39/40=0.975$; $m=40\times 0.975=39$; $v=0.975\times 40\times 0.025=0.975$; $\sigma=0.987$; and the number of detected black speckles needed to declare a detection is $S_{B\&W} \geq 10\times 0.987+39=48.87$]

Scenario #3: Scenario #3 is identical to Scenario #1 except that, because of sabotage, only 6 of 40 black speckles remain and are detected. Since at least 11 black speckles are required for a declaration of "specklemark found," the declaration can not be made. However, if a second page from the same suspect document is available, a second suspect page image can be used to improve the chances of specklemark detection for the two-page suspect document as a whole. If an additional 5 black speckles are found in the second suspect page image for a total of 11 from the two suspect page images, the values from the two page images can be combined to meet a detection threshold of 11, and a declaration of "specklemark found" can be made for the two-page document as a whole. [In this example, using the combined values from the two suspect pages, $p_U=1/80=0.0125$; $m=80\times 0.0125=1$; $v=0.0125\times 80\times 0.9875=0.9875$; $\sigma=0.9937$; and the number of detected black and white speckles needed to declare a detection is $S_{B\&W} \geq 10\times 0.9937+1=10.937$].

Computerized Implementation

Figure 9:
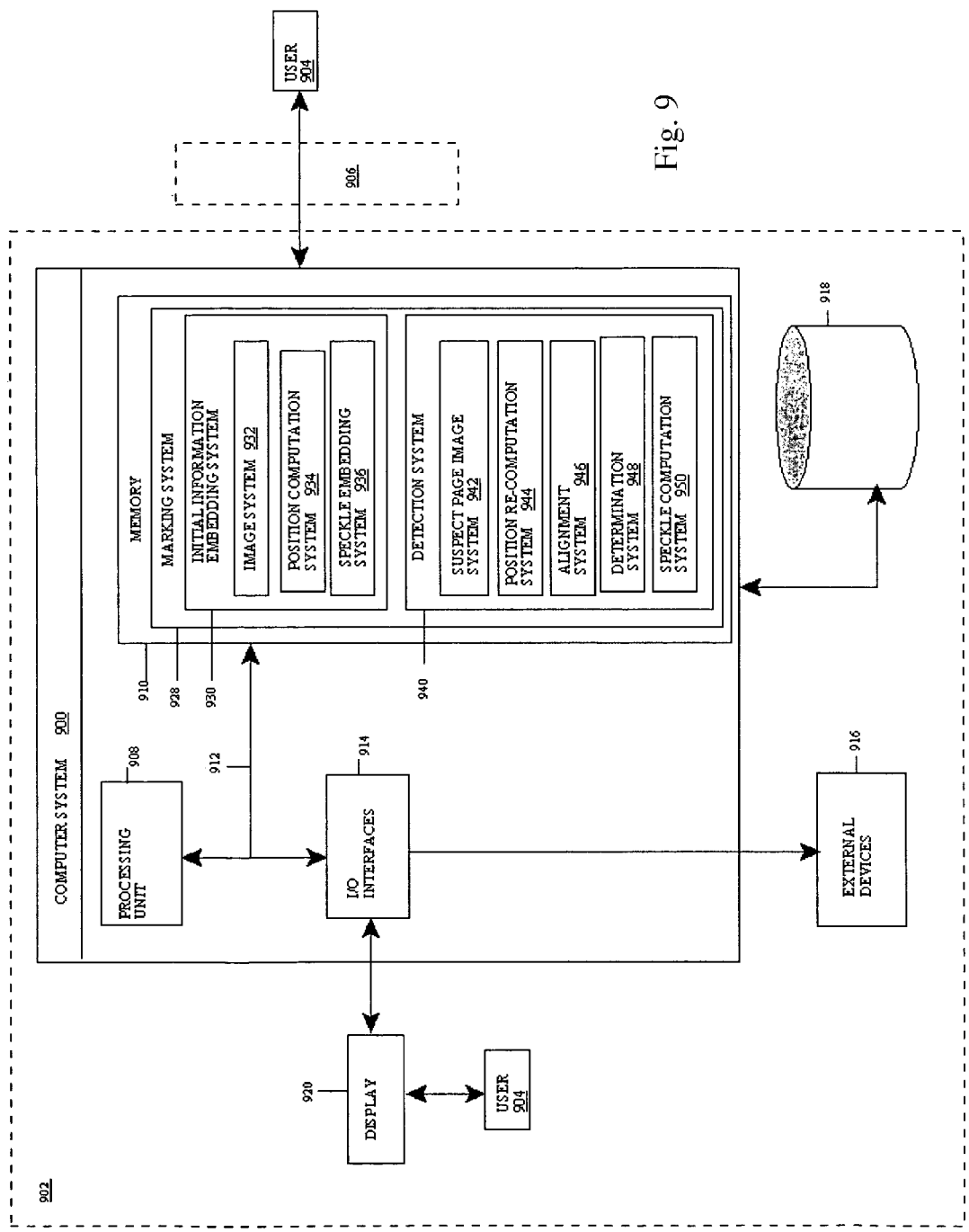
FIG. 9 is a computer system that can be used for marking text

Referring now to FIG. 9 a more specific computerized implementation of the present invention will be shown and described. In FIG. 9, computer system 900 is provided in a computer infrastructure 902. Computer system 900 is intended to represent any type of computer system capable of carrying out the teachings of the present invention. For example, computer system 900 can be a laptop computer, a desktop computer, a workstation, a handheld device, a server, a cluster of computers, etc. In addition, as will be further described below, computer system 900 can be deployed and/or operated by a service provider that provides a service for displaying images of conference call participants in accordance with the present invention. It should be appreciated that a user 904 can access computer system 900 directly, or can operate a computer system that communicates with computer system 900 over a network 906 (e.g., the Internet, a wide area network (WAN), a local area network (LAN), a virtual private network (VPN), etc). In the case of the latter, communications between computer system 900 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 900 is shown including a processing unit 908, a memory 910, a bus 912, and input/output (I/O) interfaces 914. Further, computer system 900 is shown in communication with external devices/resources 916 and one or more storage systems 918. In general, processing unit 908 executes computer program code, marking system 928, that is stored in memory 910 and/or storage system(s) 918. While executing computer program code, processing unit 908 can read and/or write data, to/from memory 910, storage system(s) 918, and/or I/O interfaces 914. Bus 912 provides a communication link between each of the components in computer system 900. External devices/resources 916 can comprise any devices (e.g., keyboard, pointing device, display (e.g., display 920, printer, etc.) that enable the user 104 to interact with computer system 900 and/or any devices (e.g., network card, modem, etc.) that enable computer system 900 to communicate with one or more other computing devices.

Computer infrastructure 902 is only illustrative of various types of computer infrastructures that can be used to implement the present invention. For example, in one embodiment, computer infrastructure 902 can comprise two or more computing devices (e.g., a server cluster) that communicate over a network (e.g., network 906) to perform the various process steps of the invention. Moreover, computer system 900 is only representative of the many types of computer systems that can be used in the practice of the present invention, each of which can include numerous combinations of hardware/software. For example, processing unit 908 can comprise a single processing unit, or can be distributed across one or more processing units in one or more locations, e.g., on a client and server. Similarly, memory 910 and/or storage system(s) 918 can comprise any combination of various types of data storage and/or transmission media that reside at one or more physical locations. Further, I/O interfaces 914 can comprise any system for exchanging information with one or more external devices/resources 916. Still further, it is understood that one or more additional components (e.g., system software, communication systems, cache memory, etc.) not shown in FIG. 9 can be included in computer system 900. However, if computer system 900 comprises a handheld device or the like, it is understood that one or more external devices/resources 916 (e.g., display 920) and/or one or more storage system(s) 918 can be contained within computer system 900, and not externally as shown.

Storage system(s) 918 can be any type of system (e.g., a database) capable of providing storage for information under the present invention. Such information can include, for example, documents, digitized images, information, speckle data, etc., etc. To this extent, storage system(s) 918 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 904 can contain computerized components similar to those described above with regard to computer system 900.

Shown in memory 910 (e.g., as a computer program product) is marking system 928 in accordance with the present invention.

In general, marking system performs the steps of the present invention as discussed above. Specifically, as shown, marking system 928 includes initial information embedding system 930, which itself includes image system 932, position computation system 934, and speckle embedding system 936. In addition, marking system 928 includes detection system 940, which includes suspect page image system 944, position re-computation system 944, alignment system 946, determination system 948, and speckle computation system 950. It should be understood that the functions of these systems could be provided in a different configuration/quantity of systems. They have been shown as such in FIG. 9 for illustrative purposes only.

In any event, initial information embedding system 928 will embed information into an original document and subsequently determining the presence of the embedded information in a copy of the original document. To this extent, image system 932 will provide a digitized image having at least one image plane. In a typical embodiment, the at least one image plane being represented by an image array having brightness data for a plurality of pixels, each of said pixels having at least one color component and a pixel position. Once the digitized image is provided, position computation system 934 will compute a first set of candidate positions for embedding speckles into the digitized image based on information to be embedded, and then compute a second set of candidate positions for embedding ghost speckles into the digitized image based on the information to be embedded. Thereafter, speckle embedding system 936 will embed the speckles into the digitized image to create a composite image.

As an extension of the present invention, other information can be embedded into at least one page of a document copy, and then it can be subsequently detecting whether said other information had been embedded into at least one page of a suspect document copy. To embed other information position computation system 934 will compute a third set of candidate positions for embedding white speckles into the page image based on said information to be embedded. Then, speckle embedding system 936 will embed white speckles into the page image at positions where they are predominantly or totally within the edges of the page image's text.

The detection of information in a suspect page of a document copy is accomplished via detection system 940 as follows. First suspect page image system 942 will provide a digitized suspect page image having at least one image plane, each said image plane being represented by an image array having brightness data for a plurality of pixels, each of said pixels having at least one color component and having a pixel position. Position re-computation system 944 will then recompute the first set of candidate positions for embedding speckles into the page image based on said information to be embedded, and recompute the second set of candidate positions for embedding ghost speckles into the page image based on said information to be embedded. After the recomputing, alignment system 946 will geometrically align said suspect page image with the page image.

Once the alignment is complete, determination system 948 will determine at each black speckle position whether the suspect page image had a nearby black speckle, and speckle computation system 950 will compute the number of black speckle positions for which that suspect page image had a black speckle nearby. Similarly determination system 948 will determine at each ghost speckle position whether the suspect page image had a nearby black speckle, and speckle computation system 950 will compute the number of ghost speckle positions for which that suspect page image had a black speckle nearby.

As an extension of these steps, position re-computing system 944 can recompute the third set of candidate positions for embedding white speckles into the page image based on said information to be embedded, determination system can determine at each white speckle position whether the suspect page image had a nearby white speckle; position computation system 934 can compute the number of white speckle positions for which that suspect page image had a white speckle nearby; and determination system can determine whether the suspect printed page possessed said other information to be embedded based on: the number of white speckle positions, and the number of white speckle positions for which the suspect page had a nearby white speckle.

Still yet, determination system 948 can determining whether the suspect printed page possessed said information to be embedded. It will typically accomplish this based on: the number of black speckle positions, the number of black speckle positions for which the suspect page had a nearby black speckle, the number of ghost-speckle positions, and the number of ghost-speckle positions for which the suspect page had a nearby black speckle.

The present invention can be offered as a business method on a subscription or fee basis. For example, one or more components of the present invention can be created, maintained, supported, and/or deployed by a service provider that offers the functions described herein for customers. That is, a service provider can be used to provide a service for displaying images of conference call participants, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method of enhancing document security and detecting fraud, comprising:
   providing at least one computer system;
   embedding, using the at least one computer system, information into an original document and subsequently determining the presence of the embedded information in a copy of the original document, the embedding step including:
   providing, using the at least one computer system, a digitized image having at least one image plane, the at least one image plane being represented by an image array having brightness data for a plurality of pixels, each of said pixels having at least one color component and a pixel position;
   computing, using the at least one computer system, a first set of candidate positions for embedding speckles into the digitized image based on information to be embedded;
   computing, using the at least one computer system, a second set of candidate positions for embedding ghost speckles into the digitized image based on the information to be embedded, wherein the second set of candidate positions are white areas of the original document and the ghost speckles are left white and act as a credibility control during subsequent specklemark detection; and
   embedding, using the at least one computer system, the speckles into the digitized image to create a composite image.

2. A method comprising:
   providing at least one computer system;
   embedding, using the at least one computer system, information into at least one page of a document copy and subsequently detecting whether said information had been embedded into at least one page of a suspect document copy,
   said document copy being in a rasterized format, herein called a digitized page image,
   said information being embedded through steps of:
      providing, using the at least one computer system, the digitized page image having at least one image plane, each said image plane being represented by an image array having brightness data for a plurality of pixels, each of said pixels having at least one color component and having a pixel position;
      computing, using the at least one computer system, a first set of candidate positions for embedding black speckles into the page image based on said information to be embedded;
      computing, using the at least one computer system, a second set of candidate positions for embedding ghost speckles into the page image based on said information to be embedded, wherein the second set of candidate positions are white areas of the original document and the ghost speckles are left white and act as a credibility control during subsequent specklemark detection; and
      embedding, using the at least one computer system, black speckles into the page image at positions where they are not near the edges of the page image's text.

3. The method of claim 2, further comprising: embedding additional information into said at least one page of a document copy and subsequently detecting whether the additional information had been embedded into at least one page of a suspect document copy, the additional information being embedded through steps of:
  computing a third set of candidate positions for embedding white speckles into the page image based on said information to be embedded; and
  embedding white speckles into the page image at positions where they are predominantly or totally within the edges of the page image's text.

4. The method of claim 3, a printed copy of said suspect document copy being converted into a rasterized format by scanning said printed copy forming a digitized suspect page image.

5. The method of claim 2, the subsequent detection of said information in a suspect page of a document copy being accomplished through steps of:
  providing a digitized suspect page image having at least one image plane, each said image plane being represented by an image array having brightness data for a plurality of pixels, each of said pixels having at least one color component and having a pixel position;
  recomputing the first set of candidate positions for embedding speckles into the page image based on said information to be embedded;
  recomputing the second set of candidate positions for embedding ghost speckles into the page image based on said information to be embedded;
  geometrically aligning said suspect page image with the page image;
  determining at each black speckle position whether the suspect page image had a nearby black speckle;
  computing the number of black speckle positions for which that suspect page image had a black speckle nearby;
  determining at each ghost speckle position whether the suspect page image had a nearby black speckle;
  computing the number of ghost speckle positions for which that suspect page image had a black speckle nearby; and
  determining whether the suspect printed page possessed said information to be embedded.

6. The method of claim 5, the determining whether the suspect printed page possessed said information to be embedded being based on the number of black speckle positions, the number of black speckle positions for which the suspect page had a nearby black speckle, the number of ghost-speckle positions, and the number of ghost-speckle positions for which the suspect page had a nearby black speckle.

7. The method of claim 5, wherein the subsequently detecting the additional information in a suspect page of a document copy includes:
  recomputing the third set of candidate positions for embedding white speckles into the page image based on said information to be embedded;
  determining at each white speckle position whether the suspect page image had a nearby white speckle;
  computing the number of white speckle positions for which that suspect page image had a white speckle nearby; and
  determining whether the suspect printed page possessed the additional information to be embedded based on:
    the number of white speckle positions, and
    the number of white speckle positions for which the suspect page had a nearby white speckle.

8. A computer system comprising:
  at least one computing device including at least one component to enhance document security and fraud detection by:
    embedding information into an original document and subsequently determining the presence of the embedded information in a copy of the original document;
    computing a first set of candidate positions for embedding speckles into a digitized image based on information to be embedded, and for computing a second set of candidate positions for embedding ghost speckles into the digitized image based on the information to be embedded, wherein the second set of candidate positions are white areas of the original document and the ghost speckles are left white and act as a credibility control during subsequent specklemark detection, the digitized image having at least one image plane, the at least one image plane being represented by an image array having brightness data for a plurality of pixels, each of said pixels having at least one color component and a pixel position; and
    embedding the speckles into the digitized image to create a composite image.

9. The system of claim 8, wherein the at least one component further enhances document security and fraud protection by:
  recomputing the first set of candidate positions for embedding speckles into the page image based on said information to be embedded, and for recomputing the second set of candidate positions for embedding ghost speckles into the page image based on said information to be embedded;
  geometrically aligning said suspect page image with the page image;
  determining at each black speckle position whether the suspect page image had a nearby black speckle;
  computing the number of black speckle positions for which that suspect page image had a black speckle nearby;
  determining at each ghost speckle position whether the suspect page image had a nearby black speckle;
  computing the number of ghost speckle positions for which that suspect page image had a black speckle nearby; and
  determining whether the suspect printed page possessed said information to be embedded.

10. The system of claim 8, wherein the at least one component further enhances document security and fraud protection by: the determining whether the suspected printed page possessed said information to be embedded includes making the determination based on the number of black speckle positions, the number of black speckle positions for which the suspect page had a nearby black speckle, the number of ghost-speckle positions, and the number of ghost-speckle positions for which the suspect page had a nearby black speckle.

11. The system of claim 8, wherein the at least one component further enhances document security and fraud protection by: subsequently detecting additional embedded information in a suspect page of a document copy by:
  recomputing a third set of candidate positions for embedding white speckles into the page image based on said information to be embedded;
  determining at each white speckle position whether the suspect page image had a nearby white speckle;
  computing the number of white speckle positions for which that suspect page image had a white speckle nearby; and determining whether the suspect printed page possessed the additional information to be embedded based on:
the number of white speckle positions, and
the number of white speckle positions for which the suspect page had a nearby white speckle.

12. A non-transitory computer-readable storage medium for enhancing document security and detecting fraud, the computer-readable storage medium comprising program code to be executed by a computer system to perform the following steps:

embedding information into an original document and subsequently determining the presence of the embedded information in a copy of the original document;

computing a first set of candidate positions for embedding speckles into a digitized image based on information to be embedded, and for computing a second set of candidate positions for embedding ghost speckles into the digitized image based on the information to be embedded, wherein the second set of candidate positions are white areas of the original document and the ghost speckles are left white and act as a credibility control during subsequent specklemark detection, the digitized image having at least one image plane, the at least one image plane being represented by an image array having brightness data for a plurality of pixels, each of said pixels having at least one color component and a pixel position; and embedding the speckles into the digitized image to create a composite image.

13. The non-transitory computer-readable storage medium of claim 12, the computer-readable storage medium further comprising program code to be executed by the computer system to perform the following additional steps:

recomputing the first set of candidate positions for embedding speckles into the page image based on said information to be embedded, and for recomputing the second set of candidate positions for embedding ghost speckles into the page image based on said information to be embedded;

geometrically aligning said suspect page image with the page image;

determining at each black speckle position whether the suspect page image had a nearby black speckle;

computing the number of black speckle positions for which that suspect page image had a black speckle nearby;

determining at each ghost speckle position whether the suspect page image had a nearby black speckle;

computing the number of ghost speckle positions for which that suspect page image had a black speckle nearby; and determining whether the suspect printed page possessed said information to be embedded.

14. The non-transitory computer-readable storage medium of claim 13, the determination of whether the suspected printed page possessed said information to be embedded being based on the number of black speckle positions, the number of black speckle positions for which the suspect page had a nearby black speckle, the number of ghost-speckle positions, and the number of ghost-speckle positions for which the suspect page had a nearby black speckle.

* * * * *